United States Patent
Hiyama et al.

(10) Patent No.: US 7,719,584 B2
(45) Date of Patent: May 18, 2010

(54) IMAGE SENSOR

(75) Inventors: Hiroki Hiyama, Zama (JP); Yuichiro Hatano, Yamato (JP); Yu Arishima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 11/688,026

(22) Filed: Mar. 19, 2007

(65) Prior Publication Data
US 2007/0229686 A1    Oct. 4, 2007

(30) Foreign Application Priority Data
Mar. 31, 2006 (JP) .............................. 2006-100395

(51) Int. Cl.
*H04N 5/335* (2006.01)
(52) U.S. Cl. ...................... 348/294; 348/308
(58) Field of Classification Search ................. 348/308, 348/294
See application file for complete search history.

(56) References Cited

U.S. PATENT DOCUMENTS

| | | | |
|---|---|---|---|
| 5,262,871 A * | 11/1993 | Wilder et al. ................ 348/307 |
| 5,278,660 A | 1/1994 | Sugiki .................... 358/213.22 |
| 6,466,265 B1 * | 10/2002 | Lee et al. ..................... 348/308 |
| 6,480,227 B1 * | 11/2002 | Yoneyama ................... 348/308 |
| 6,847,026 B2 | 1/2005 | Koizumi et al. .......... 250/208.1 |
| 6,888,568 B1 * | 5/2005 | Neter ....................... 348/222.1 |
| 6,963,371 B2 | 11/2005 | Sakurai et al. .............. 349/301 |
| 6,992,714 B1 | 1/2006 | Hashimoto et al. .......... 348/273 |
| 7,408,683 B2 | 8/2008 | Sato et al. .................... 358/474 |
| 2003/0011731 A1 | 1/2003 | Yoshida et al. .............. 349/117 |
| 2003/0020819 A1 | 1/2003 | Fukuda ........................ 348/246 |
| 2003/0086005 A1 | 5/2003 | Nakamura ................ 348/223.1 |
| 2003/0141436 A1 | 7/2003 | Koizumi et al. .......... 250/208.1 |
| 2003/0206234 A1 | 11/2003 | Sakurai et al. .............. 348/301 |

(Continued)

FOREIGN PATENT DOCUMENTS

EP    0 967 795 A2    12/1999

(Continued)

OTHER PUBLICATIONS

May 9, 2008 Chinese Official Action in Chinese Patent Appln. No. 200710091484.5 (with translation).

*Primary Examiner*—Jason Chan
*Assistant Examiner*—Yih-Sien Kao
(74) *Attorney, Agent, or Firm*—Fitzpatrick, Cella, Harper & Scinto

(57) ABSTRACT

An image sensor has a plurality of pixels arrayed to form a plurality of columns. The sensor includes a plurality of readout circuits which generate pixel signals based on signals supplied from the pixels of respective columns, a plurality of output channels, a plurality of column selecting switches, and a control circuit which controls the plurality of column selecting switches. The control circuit controls the plurality of column selecting switches so as to output the pixel signals of target readout pixels to output channels selected based on a selection rule in the spatial order of the pixels in the full pixel readout mode. The control circuit controls the plurality of column selecting switches so as to output the thinned-out pixel signals of target readout areas to output channels selected based on the same rule as the selection rule in the spatial order of the areas in the thinning readout mode.

13 Claims, 20 Drawing Sheets

U.S. PATENT DOCUMENTS

| | | | |
|---|---|---|---|
| 2003/0227552 A1* | 12/2003 | Watanabe | 348/220.1 |
| 2005/0068434 A1 | 3/2005 | Hatano | 348/272 |
| 2005/0088535 A1 | 4/2005 | Hatano | 348/220.1 |
| 2005/0195307 A1 | 9/2005 | Sakurai et al. | 348/308 |
| 2005/0280730 A1 | 12/2005 | Lim et al. | 348/308 |
| 2006/0164527 A1 | 7/2006 | Wada et al. | 348/272 |
| 2007/0229687 A1 | 10/2007 | Hiyama et al. | 348/294 |

FOREIGN PATENT DOCUMENTS

| | | |
|---|---|---|
| JP | 4-137888 | 5/1992 |
| JP | 7-235655 | 9/1995 |
| JP | 2000-358250 | 12/2000 |
| JP | 2003-046876 | 2/2003 |
| JP | 2003-189183 | 7/2003 |
| JP | 2003-234964 | 8/2003 |
| JP | 2003-338988 | 11/2003 |
| JP | 2004-056424 | 2/2004 |
| JP | 2004-180045 | 6/2004 |
| JP | 2005-109968 | 4/2005 |
| JP | 2005-130382 | 5/2005 |
| JP | 2005-286933 | 10/2005 |
| WO | 03/034714 A1 | 4/2003 |
| WO | WO 03/034714 A1 | 4/2003 |

* cited by examiner

F I G. 3
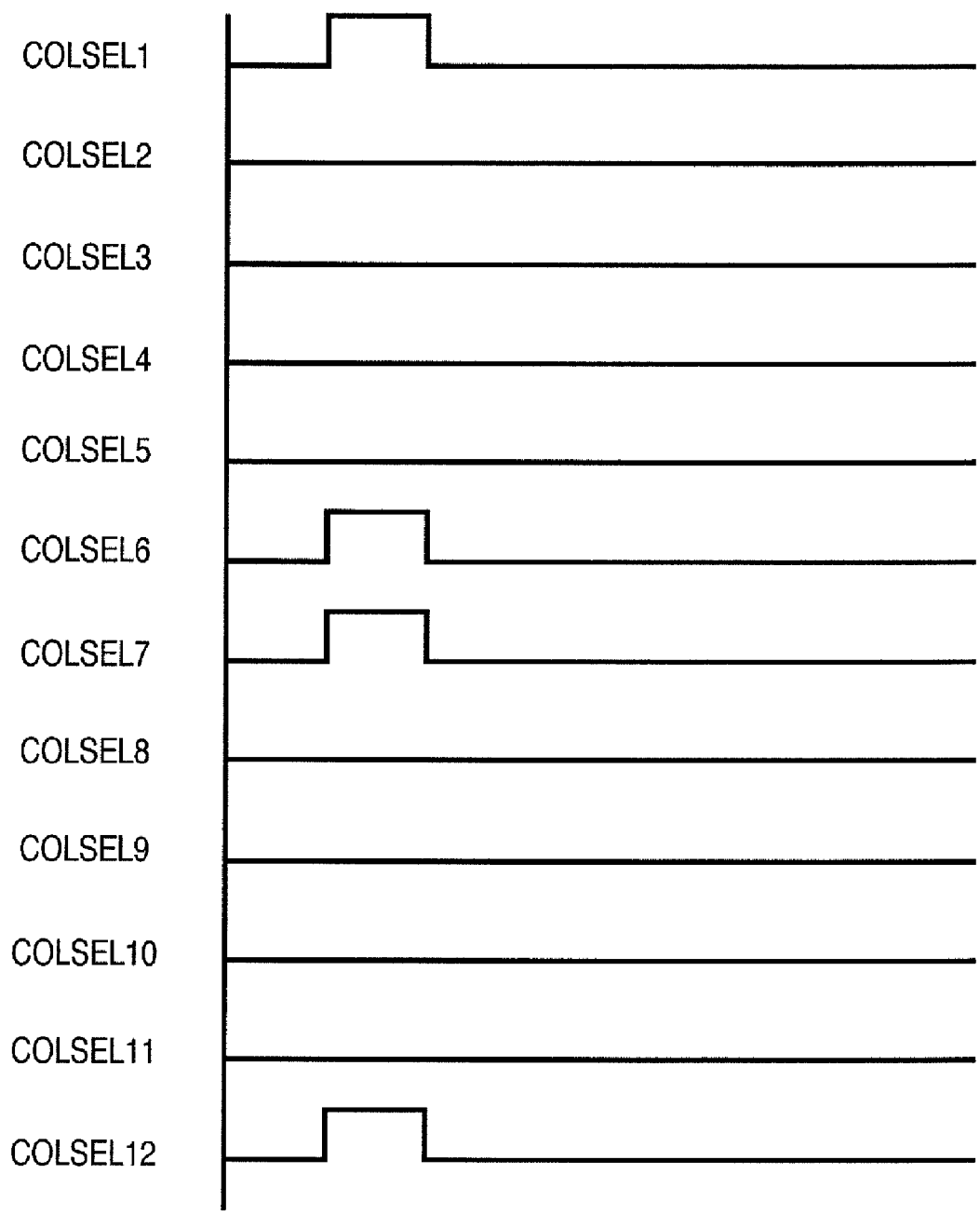

FOR USE IN ONLY FULL PIXEL READOUT MODE
FOR USE IN FULL PIXEL READOUT MODE AND AVERAGE (ADDITIONAL) READOUT MODE
AVERAGING OR ADD RANGE

IMAGE SENSOR

BACKGROUND OF THE INVENTION

1. Field of the Invention

The present invention relates to an image sensor and, more particularly, to an image sensor having a plurality of output channels.

2. Description of the Related Art

These days, image sensors for digital cameras make remarkable progress and are rapidly gaining a larger number of pixels for higher resolution of still images. Along with this, it is an urgent issue to increase the pixel signal readout speed in order to ensure sequential shooting performance necessary for a camera. Japanese Patent Laid-Open No. 2005-286933 discloses a CCD image sensor which parallely reads out pixel signals through a plurality of column shift registers to increase the readout speed.

A digital camera can capture still images, and even moving images. The digital camera generally uses one image sensor to capture both still and moving images. The image sensor requires high resolution for still images, and requires a high frame rate for moving images while decreasing the resolution to match a general moving image standard. Japanese Patent Laid-Open No. 2005-130382 discloses an image sensor which adds pixel signals to decrease the resolution and increase the frame rate.

The CCD image sensor disclosed in Japanese Patent Laid-Open No. 2005-286933 parallely reads out pixel signals through a plurality of output column shift registers. Thus, the apparent signal readout speed is higher than in readout through a single output column shift register. However, Japanese Patent Laid-Open No. 2005-286933 does not describe any idea of increasing the frame rate used in capturing a moving image from that used in capturing a still image.

The image sensor disclosed in Japanese Patent Laid-Open No. 2005-130382 adds pixel signals by merging charges on a horizontal output line. However, Japanese Patent Laid-Open No. 2005-130382 does not describe any concept of parallely outputting sums through a plurality of channels.

That is, Japanese Patent Laid-Open Nos. 2005-286933 and 2005-130382 do not have any idea of increasing the frame rate by parallely reading out low-resolution pixel signals through a plurality of channels in capturing a moving image.

Low-resolution pixel signals may be parallely read out through a plurality of channels by simply assigning them to the plurality of channels. However, this puts a load on the process of a processing circuit which processes the pixel signals. For example, to execute a process common to that in full pixel readout, the processing circuit must rearrange the order of received low-resolution pixel signals.

SUMMARY OF THE INVENTION

It is an object of the present invention to increase the readout speed in the low resolution readout mode, or in addition to this, reduce the load on a processing circuit which processes pixel signals read out in the low resolution readout mode.

According to the first aspect of the present invention, there is provided an image sensor which has a plurality of pixels arrayed to form a plurality of columns, and provides a high resolution readout mode in which pixel signals of all the pixels are read out and a low resolution readout mode in which one pixel signal is read out from each target readout area and a resolution is lower than in the high resolution readout mode, comprising a plurality of readout circuits which generate pixel signals based on signals supplied from the pixels of respective columns, a plurality of output channels, a plurality of column selecting switches, and a control circuit which controls the plurality of column selecting switches, wherein the control circuit controls the plurality of column selecting switches so as to output pixel signals of target readout pixels to output channels selected in accordance with a selection rule in a spatial order of the target readout pixels in the high resolution readout mode, and the control circuit controls the plurality of column selecting switches so as to output pixel signals of target readout areas to output channels selected in accordance with the same rule as the selection rule in a spatial order of the target readout areas in the low resolution readout mode.

According to a preferred aspect of the present invention, letting N be the number of output channels and M be the number of pixels in the target readout area, $N \leq M+1$ preferably holds.

According to another preferred aspect of the present invention, the image sensor may further comprise a plurality of averaging circuits which are inserted between the plurality of readout circuits and the plurality of column selecting switches, and generate pixel signals by calculating an average of pixel signals read out from pixels in each target readout area in the low resolution readout mode.

According to still another preferred aspect of the present invention, the image sensor may further comprise a plurality of add circuits which are inserted between the plurality of readout circuits and the plurality of column selecting switches, and generate pixel signals by calculating a sum of pixel signals read out from pixels in each target readout area in the low resolution readout mode.

According to still another preferred aspect of the present invention, the image sensor may further comprise a plurality of operation circuits which are inserted between the plurality of readout circuits and the plurality of column selecting switches, and generate pixel signals by calculating an average or sum of pixel signals read out from pixels in each target readout area in the low resolution readout mode in accordance with a mode.

According to still another preferred aspect of the present invention, the image sensor may further comprise a plurality of operation circuits which are inserted between the plurality of readout circuits and the plurality of column selecting switches, and generate pixel signals by calculating pixel signals read out from pixels in each target readout area in the low resolution readout mode.

According to still another preferred aspect of the present invention, a pixel array formed by the plurality of pixels is divided into a plurality of blocks and the sensor further comprises a plurality of block selecting switch which control connection between the plurality of blocks and the plurality of output channels.

According to the second aspect of the present invention, there is provided an image sensor which has a plurality of pixels arrayed to form a plurality of columns, and provides a high resolution readout mode in which pixel signals of all the pixels are read out and a low resolution readout mode in which one pixel signal is read out from each target readout area and a resolution is lower than in the high resolution readout mode, comprising a plurality of readout circuits which generate pixel signals based on signals supplied from the pixels of respective columns, a plurality of operation circuits which generate pixel signals by calculating pixel signals read out from the pixels in each target readout area in the low resolution readout mode, a plurality of output channels, a plurality of column selecting switches, and a control circuit which controls the plurality of column selecting switches, wherein the control circuit controls the plurality of column selecting switches so as to simultaneously output pixel signals of pixels equal in number to the plurality of output channels to the plurality of output channels in the high resolution readout mode, and the control circuit controls the plurality of column selecting switches so as to simultaneously output pixel signals of target readout areas equal in number to the plurality of output channels to the plurality of output channels in the low resolution readout mode.

According to a preferred aspect of the present invention, the operation circuits may include a circuit which calculates an average of pixel signals read out from pixels in each target readout area.

According to another preferred aspect of the present invention, the operation circuits may include a circuit which calculates a sum of pixel signals read out from pixels in each target readout area.

According to still another preferred aspect of the present invention, the image sensor may further comprise a block selecting switch which divides the plurality of pixels into blocks each of a plurality of columns, and controls outputs from the plurality of pixels of each block to the plurality of output channels.

According to the third aspect of the present invention, there is provided a camera comprising the above-described image sensor, and a circuit which processes signals output from a plurality of output channels of the image sensor.

According to a given aspect of the present invention, the readout speed increases in, for example, the low resolution readout mode because pixel signals are parally read out through a plurality of channels.

According to another aspect of the present invention, the load on a processing circuit which processes pixel signals read out in the low resolution readout mode can be reduced.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a driving timing chart of the thinning readout mode in the image sensor according to the first embodiment of the present invention;

DESCRIPTION OF THE EMBODIMENTS

Preferred embodiments of the present invention will be described below with reference to the accompanying drawings.

First Embodiment

Figure 1:
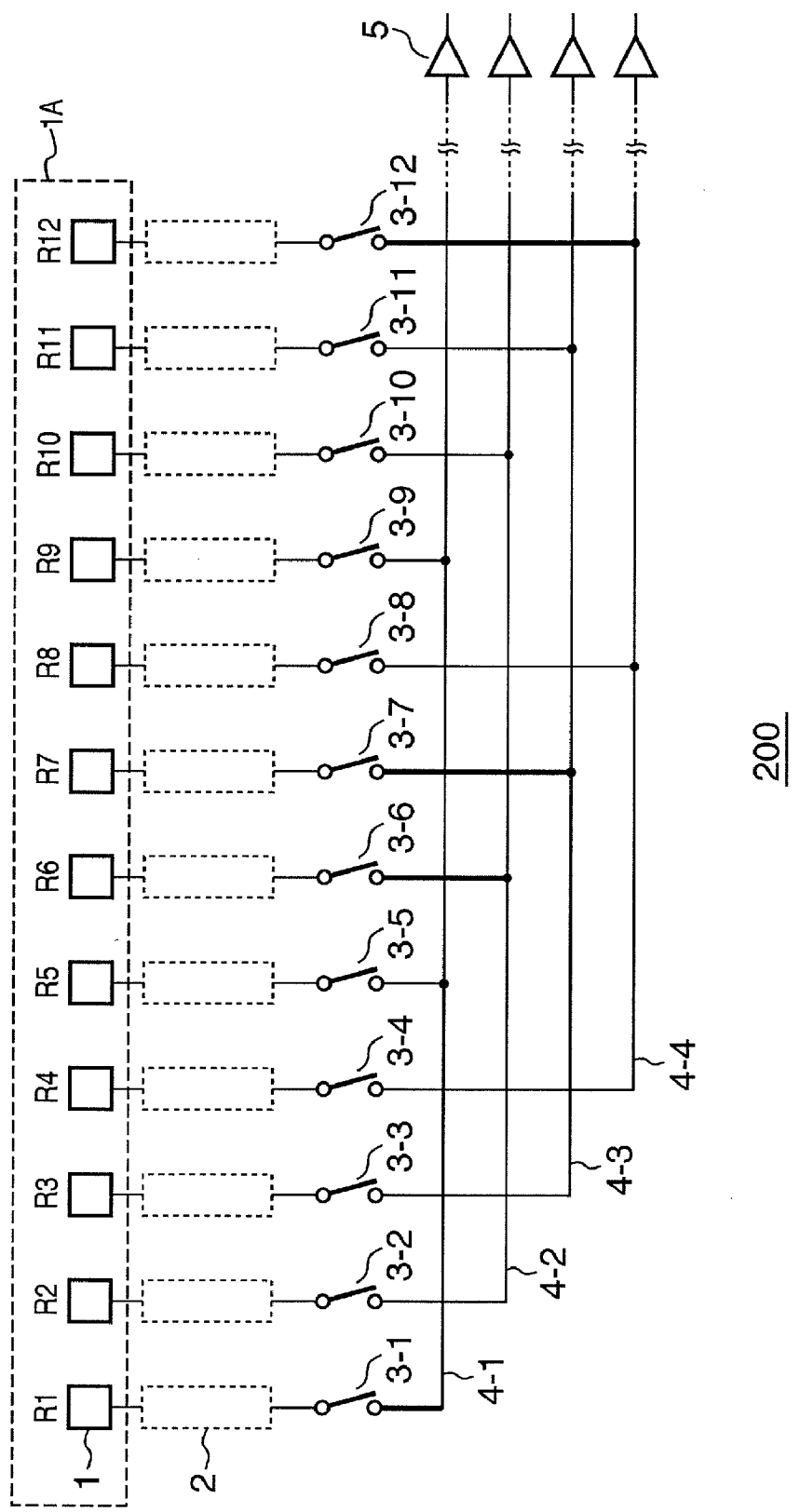
FIG. 1 is a circuit diagram showing the schematic arrangement of an image sensor according to the first embodiment of the present invention.

FIG. 1 is a circuit diagram showing the schematic arrangement of an image sensor according to the first embodiment of the present invention. An image sensor 200 comprises a pixel array area 1A where a plurality of pixels 1 are arrayed. In the pixel array area 1A, the pixels 1 can be arranged to form a plurality of columns or one or a plurality of rows. FIG. 1 shows only pixels R1 to R12 of one row corresponding to a red filter. Each readout circuit 2 generates a pixel signal based on a signal supplied from a corresponding pixel. The readout circuit 2 supplies a pixel signal to the input terminal of a corresponding column selecting switch 3. The readout circuit 2 may incorporate an amplifier circuit and the like, or may be formed from only a conductive line for transmitting a pixel signal. The output terminals of the column selecting switches 3, i.e., 3-1, 3-2, 3-3, 3-4, . . . connect to horizontal output lines (output channels) 4, i.e., 4-1, 4-2, 4-3, and 4-4. The first embodiment adopts four horizontal output lines 4, which can parally output four pixel signals. Each output amplifier 5 connects to the output side of a corresponding horizontal output line 4. The output amplifier 5 converts an impedance necessary to drive the output load.

The image sensor 200 provides a full pixel readout mode (high resolution readout mode) in which the pixel signals of all pixels are read out, and a low resolution readout mode in which one pixel signal is read out from each target readout area. In the low resolution readout mode, for example, a plurality of pixel signals from each target readout area may be added and output, or only the signal of a specific pixel may be output. The first embodiment will explain the thinning readout mode.

Figure 2:
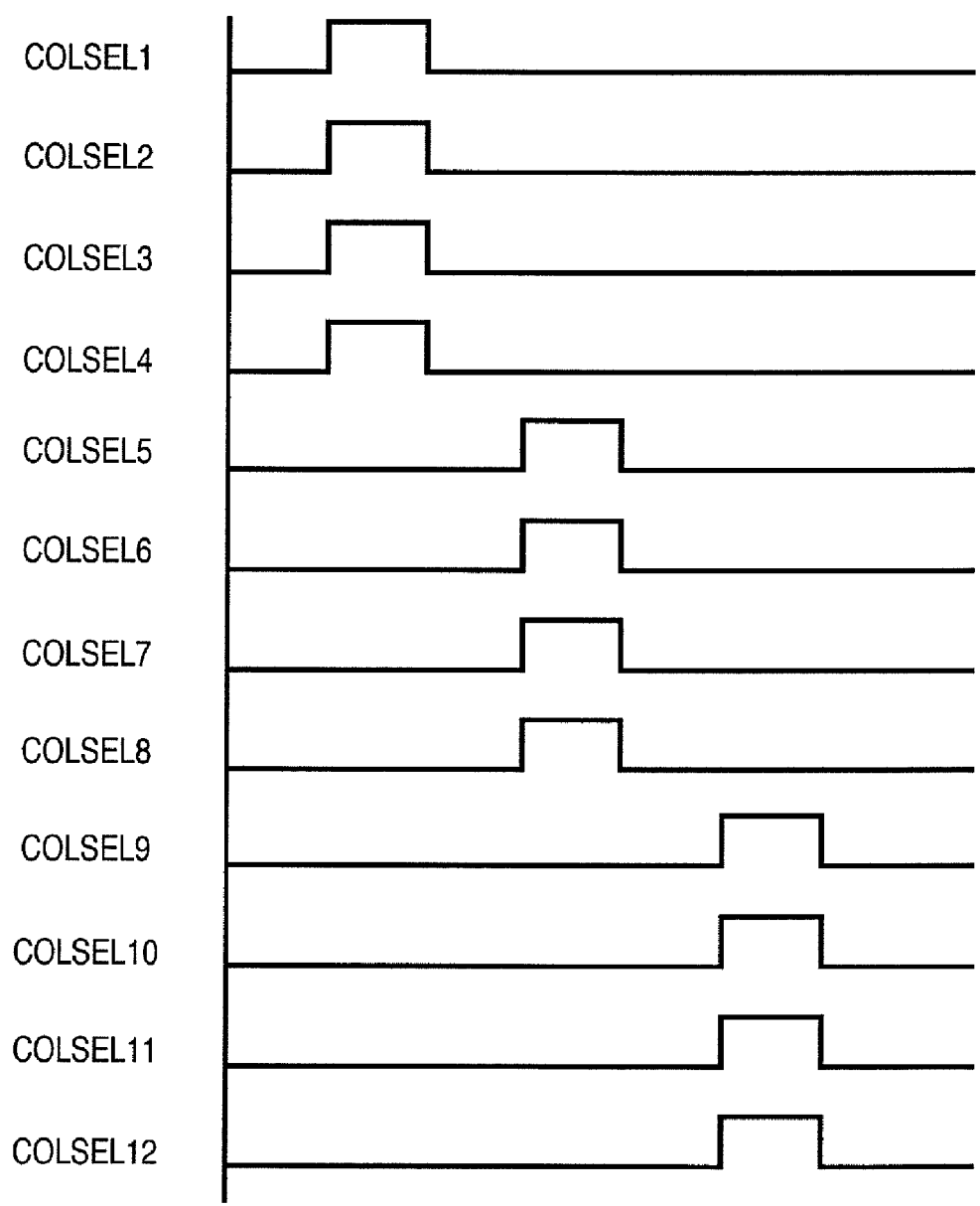
FIG. 2 is a driving timing chart of the full pixel readout mode in the image sensor according to the first embodiment of the present invention.

The operation of the image sensor 200 shown in FIG. 1 in the full pixel readout mode will be described with reference to the timing chart of FIG. 2. In FIG. 2, COLSELx represents a control signal (scan pulse signal) for controlling the column selecting switch 3-x. The control signal COLSELx changes to high level to turn on the column selecting switch 3-x, and to low level to turn it off. In this case, x means a column number. A horizontal scanning circuit (control circuit: not shown) generates the control signal COLSELx.

First, the column selecting switches 3-1, 3-2, 3-3, and 3-4 are simultaneously turned on to output pixel signals, which are read out from the pixels R1, R2, R3, and R4 to the readout circuits 2, to the horizontal output lines 4-1, 4-2, 4-3, and 4-4. At this time, the pixel signals of the pixels R1, R2, R3, and R4 are output to the horizontal output lines 4-1, 4-2, 4-3, and 4-4 in accordance with the spatial arrangement order (order in a direction from the left to right) of the pixels. Then, the column selecting switches 3-5, 3-6, 3-7, and 3-8 are simultaneously turned on to output pixel signals, which are read out from the pixels R5, R6, R7, and R8 to the readout circuits 2, to the horizontal output lines 4-1, 4-2, 4-3, and 4-4. Further, the switches 3-9, 3-10, 3-11, and 3-12 are simultaneously turned on to output pixel signals, which are read out from the pixels R9, R10, R11, and R12 to the readout circuits 2, to the horizontal output lines 4-1, 4-2, 4-3, and 4-4. By this step, the pixel signals of the 12 pixels are read out during a 3-clock period at a readout speed four times higher than the speed of readout from a single horizontal output line (requiring a 12-clock period).

The operation of the image sensor 200 shown in FIG. 1 in the thinning readout mode will be described with reference to the timing chart of FIG. 3. A ⅓ thinning operation to read out one thinned-out pixel signal from each target readout area of three pixels will be exemplified. The image sensor in the first embodiment parallely reads out the following four thinned-out pixel signals.

More specifically, the pixel signal of the pixel R1 in a target readout area (a group of pixels) of the pixels R1, R2, and R3 is output as a thinned-out pixel signal to the horizontal output line 4-1 via the column selecting switch 3-1. At the same time, the pixel signal of the pixel R6 in a target readout area of the pixels R4, R5, and R6 is output as a thinned-out pixel signal to the horizontal output line 4-2 via the column selecting switch 3-6. Also at the same time, the pixel signal of the pixel R7 in a target readout area of the pixels R7, R8, and R9 is output as a thinned-out pixel signal to the horizontal output line 4-3 via the column selecting switch 3-7. Also at the same time, the pixel signal of the pixel R12 in a target readout area of the pixels R10, R11, and R12 is output as a thinned-out pixel signal to the horizontal output line 4-4 via the column selecting switch 3-12. As a result, the four thinned-out pixel signals are read out from the 12 pixel-containing area (four target readout areas), shortening the scan time to ⅓ of that in full pixel readout.

According to the above-described column selecting method, thinned-out pixel signals are respectively output to the horizontal output lines 4-1, 4-2, 4-3, and 4-4 in the spatial order of the pixels R1, R6, R7, and R12.

In the full pixel readout mode, the pixel signals of target readout pixels are output to output channels selected according to the selection rule in the spatial order of the target readout pixels. In the thinning readout mode, the thinned-out pixel signals of target readout areas are output to output channels selected according to the same rule as the selection rule in the spatial order of the target readout areas.

Assume that there are four output channels, like the first embodiment. In the full pixel readout mode, the pixel signal of the (i+4×n)th target readout pixel (e.g., the second target readout pixel R2 from the left) is read out through the ith (e.g., second from the top) horizontal output line. Note that i is a natural number satisfying 0<i≦4, and n is 0 or a natural number. In the thinning readout mode, the pixel signal of a pixel (e.g., the pixel R6) in the (i+4×n)th target readout area (e.g., the second target readout area from the left, i.e., the area of the pixels R4 to R6) is similarly read out through the ith (e.g., second from the top) horizontal output line.

Although the number of readout pixel signals is different between the full pixel readout mode and the thinning readout mode, the correspondence between the spatial order of target readout pixels or areas and the horizontal output lines (output channels) is the same. In the thinning readout mode, pixel signals read out from the image sensor through the four output channels need not be rearranged.

Letting N be the number of horizontal output lines 4 (number of output channels) and M be the number of pixels in each target readout area in the thinning readout mode, N and M are preferably determined so the relation: N≦M+1 holds. In this case, the pixel signals of target readout pixels or areas are read out to horizontal output lines commonly determined by the spatial order of the target readout pixels or areas in both full pixel readout and thinning readout without adding any column selecting switch dedicated to thinning readout. M will also be called the unit number of thinned-out pixels.

Under the condition: N>M+1, a column selecting switch dedicated to thinning readout must be added to make the output orders of thinning readout and full pixel readout coincide with each other. The parasitic capacitances of the horizontal output lines 4 increase due to increases in chip area and the number of switches. As long as these increases are permissible, the number of horizontal output lines can be increased without any restriction on the unit number of thinned-out pixels, increasing the readout speed.

Figure 19:
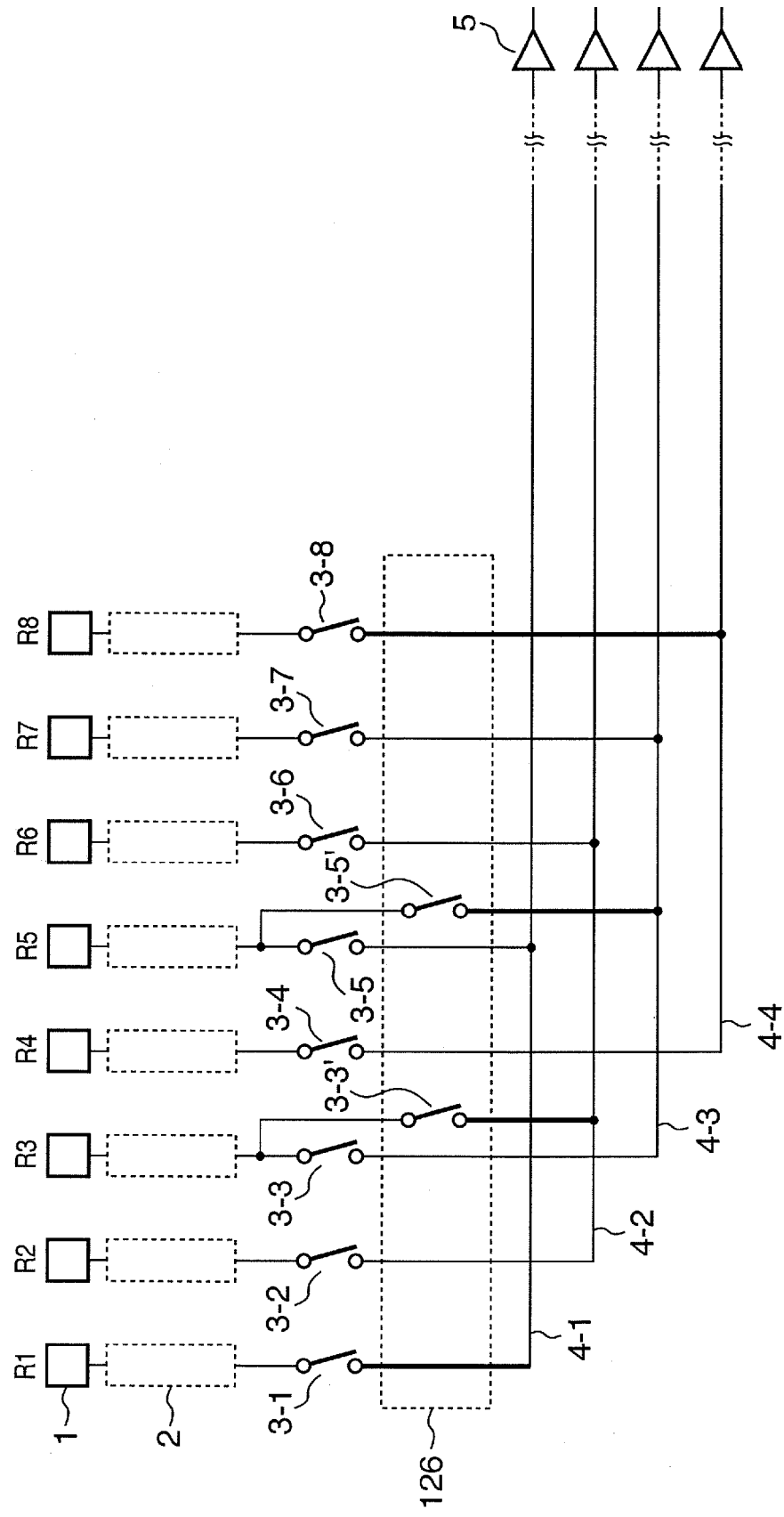
FIG. 19 is a circuit diagram showing an example of the image sensor according to the first embodiment of the present invention.

FIG. 19 is a circuit diagram showing an example of the arrangement of an image sensor under the condition: N>M+1. In the example shown in FIG. 19, the number N of output channels is 4, and the unit number M of thinned-out pixels is 2. In this example, one thinned-out pixel signal can be output from an area of the pixels R1 and R2 in thinning readout using the horizontal output line 4-1 used to output the pixel signal of the pixel R1 in full pixel readout. However, a dedicated switch such as a switch 3-3' must be added to output a thinned-out pixel signal to the horizontal output line 4-2 from an area of the pixels R3 and R4 in thinning readout. Similarly, a dedicated switch such as a switch 3-5' must be added to output a thinned-out pixel signal to the horizontal output line 4-3 from an area of the pixels R5 and R6. The chip area increases because an area 126 for forming the dedicated switches 3-3' and 3-5' is additionally necessary. The arrangement of the switches 3-3' and 3-5' adds a parasitic capacitance to the horizontal output lines 4-2 and 4-3. Hence, the relation: N≦M+1 preferably holds.

The image sensor according to the first embodiment of the present invention can parallely output a plurality of thinned-out pixel signals through a plurality of horizontal output lines to increase the frame rate in thinning readout.

In both the full pixel readout operation and thinning readout operation, the pixel signals of target readout pixels or areas are output to horizontal output lines determined by a common selection rule in the spatial order of the target readout pixels or areas. This can obviate the need to rearrange signals in thinning readout, reducing the load on the processing circuit which processes signals output through the amplifiers 5.

When the relation: N≦M+1 holds, it is possible to simplify the circuit arrangement, decrease the chip area, and reduce the parasitic capacitance of the horizontal output line.

Second Embodiment

Figure 4:
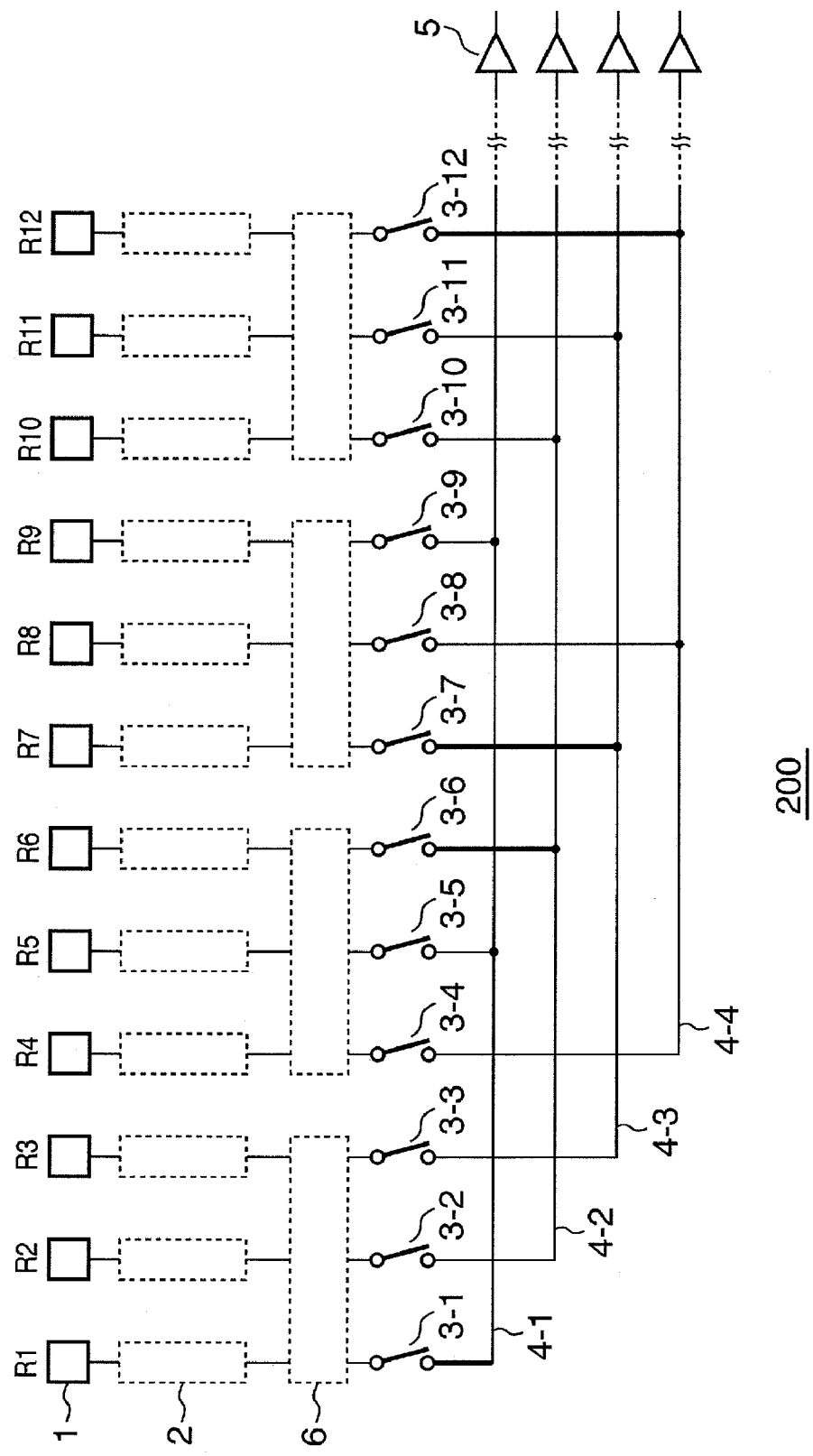
FIG. 4 is a circuit diagram showing the schematic arrangement of an image sensor according to the second embodiment of the present invention.

FIG. 4 is a circuit diagram showing the schematic arrangement of an image sensor according to the second embodiment of the present invention. The arrangement shown in FIG. 4 is different from that shown in FIG. 1 in that averaging circuits 6 are inserted between readout circuits 2 and column selecting switches 3. The averaging circuit 6 averages signals in a target readout area in the low resolution readout mode.

The averaging circuit (operation circuit) 6 calculates and outputs the average value of pixel signals in accordance with an activation signal. An output from each averaging circuit 6 is supplied to one of four horizontal output lines through one of the column selecting switches 3 corresponding to three pixels subjected to averaging. Outputs from the averaging circuits 6 can be supplied to horizontal output lines 4-1, 4-2, 4-3, and 4-4 through the switches 3-1, 3-6, 3-7, and 3-12, similar to the thinning readout mode in the first embodiment.

According to the second embodiment, similar to the first embodiment, the image sensor can parallely output a plurality of pixel signals through a plurality of horizontal output lines in the low resolution readout mode, increasing the frame rate in the low resolution readout mode.

In both the full pixel readout operation and low resolution readout operation, the pixel signals of target readout pixels or areas are output to horizontal output lines determined by a common selection rule in the spatial order of the target readout pixels or areas. This can obviate the need to rearrange signals in low resolution readout, reducing the load on the processing circuit which processes signals output through amplifiers 5.

When the relation: N≦M+1 holds, it is possible to simplify the circuit arrangement, decrease the chip area, and reduce the parasitic capacitance of the horizontal output line.

Figure 5:
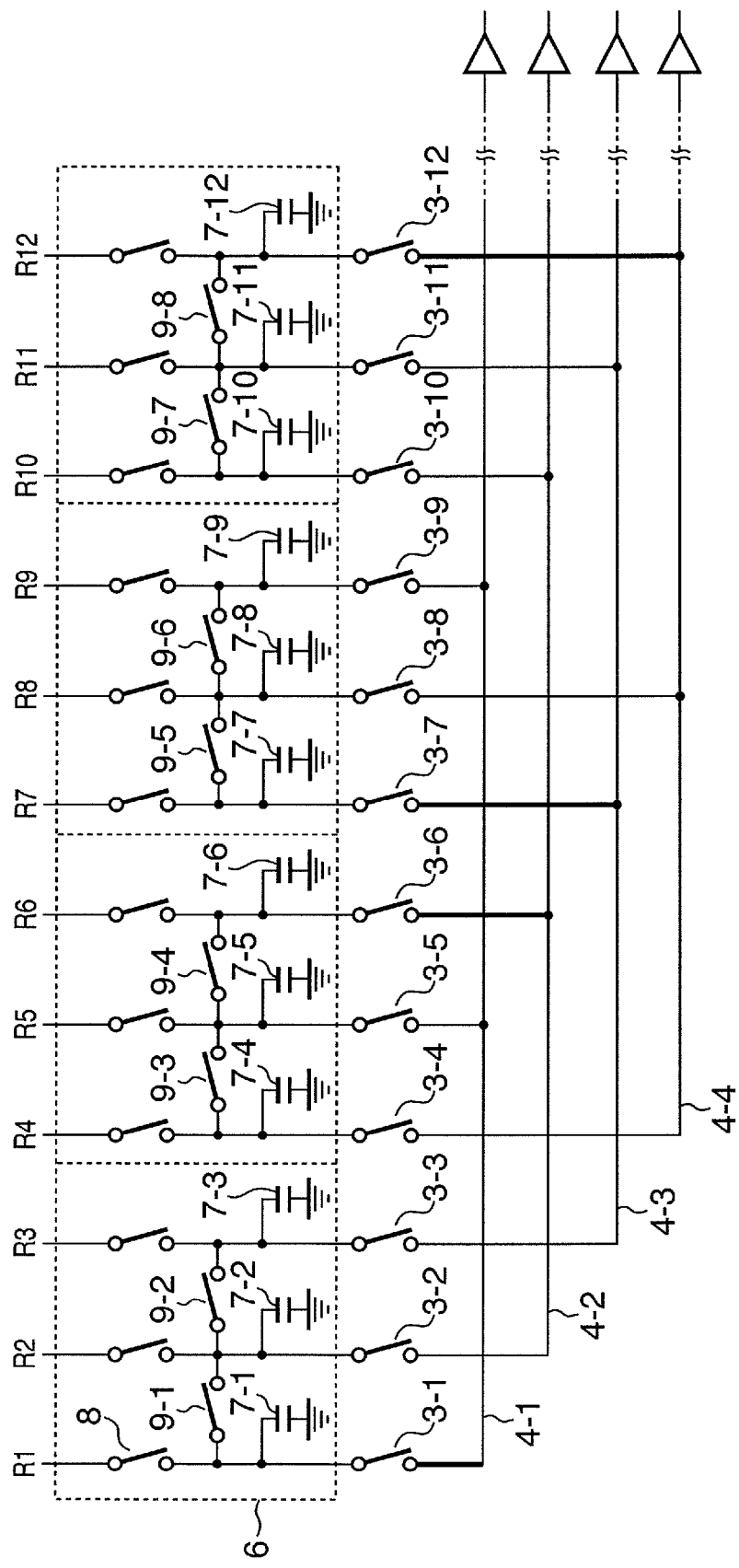
FIG. 5 is a circuit diagram showing a concrete example of the arrangement of the averaging circuit of the image sensor according to the second embodiment of the present invention.

FIG. 5 is a circuit diagram showing a concrete example of the arrangement of the averaging circuit in FIG. 4. Each averaging circuit 6 comprises capacitors 7-x7-x corresponding to respective pixels, sample-and-hold switches 8 to sample and hold outputs from the respective pixels, and short switches 9-x to short-circuit the capacitors 7-x.

Figure 6:
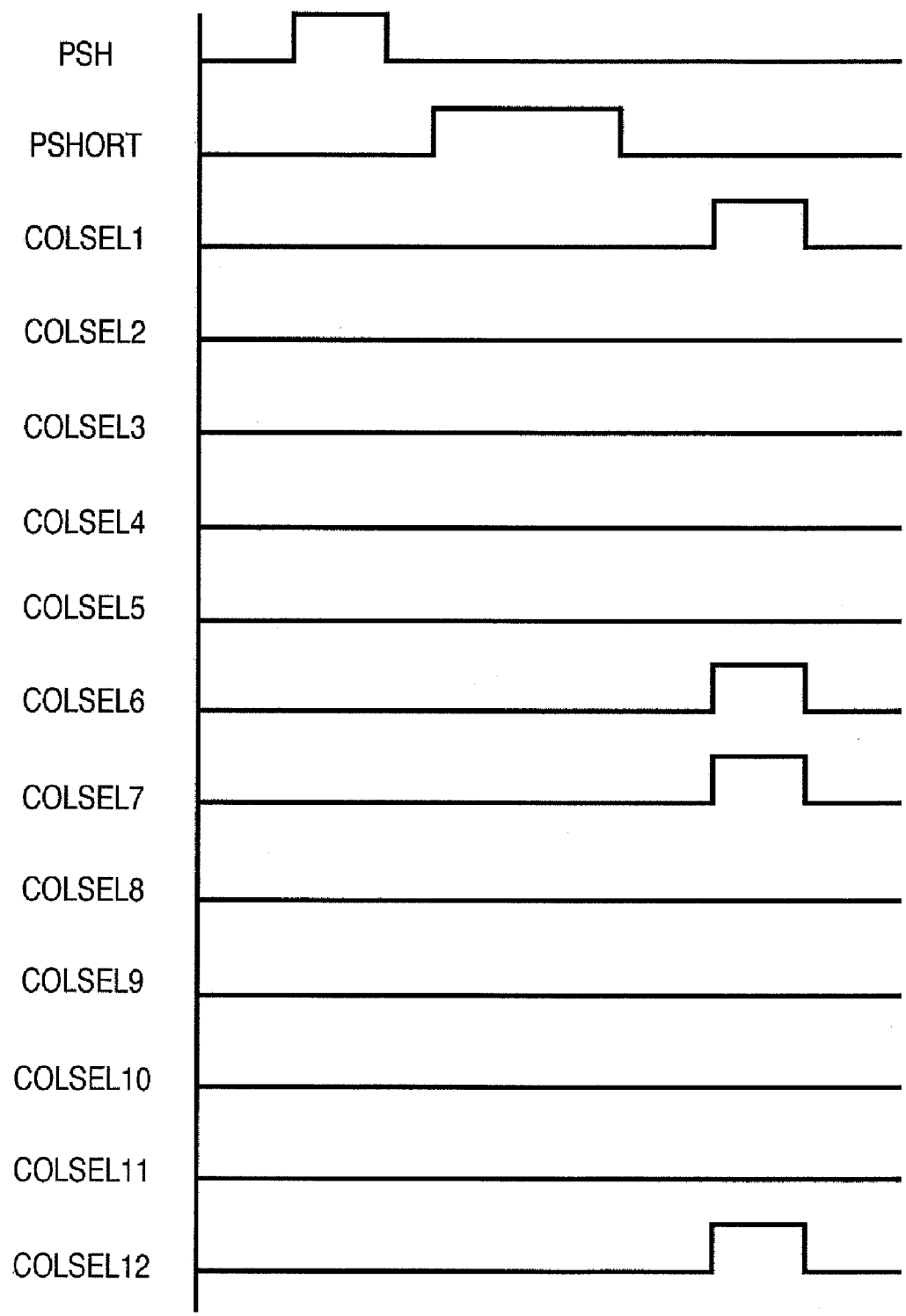
FIG. 6 is a driving timing chart of the average readout mode (thinning readout) in the image sensor according to the second embodiment of the present invention.

The averaging circuit 6 performs the averaging process as follows. FIG. 6 is a timing chart of the averaging process. PSH represents a common control signal supplied to the sample-and-hold switches 8. PSHORT represents a common control signal supplied to the short switches 9. A horizontal scanning circuit (control circuit: not shown) generates the control signals PSH, PSHORT, and COLSELx.

First, the control signal PSH changes to high level (sample-and-hold pulse) for a predetermined period to turn on the sample-and-hold switches 8 and hold pixel signals of one row as charges in the capacitors 7 of respective columns. Then, the control signal PSHORT changes to high level to turn on the short switches 9 and merge pixel signals held by the capacitors 7-1, 7-2, and 7-3 through the short switches 9-1 and 9-2. PSHORT returns to low level to turn off the short switches 9-1 and 9-2. At this time, the capacitors 7-1, 7-2, and 7-3 hold the average values of the three pixel signals. Similarly, the pixel signals of the capacitors 7-4, 7-5, and 7-6, those of the capacitors 7-7, 7-8, and 7-9, and those of the capacitors 7-10, 7-11, and 7-12 are averaged. After that, the column selecting switches 3-1, 3-6, 3-7, and 3-12 are turned on to output the four average values to the horizontal output lines 4-1, 4-2, 4-3, and 4-4.

Low resolution readout accompanied by the averaging process is more advantageous in increasing the S/N ratio than simple thinning in the first embodiment. Many main noise components such as photoshot noise and thermal noise of a circuit have no correlation between pixels. Therefore, averaging the pixel signals of M pixels ideally increases the S/N ratio by $\sqrt{M}$. Another advantage of the averaging process is to equalize the pitches of the barycenters of areas each formed from a plurality of pixels to generate a pixel signal in low resolution readout. That is, the spatial barycenters of areas each formed from a plurality of pixels to generate an averaged pixel signal match the positions of the pixels R2, R5, R8, and R11. This eliminates a nonuniform resolution generated by simple thinning in the first embodiment.

The second embodiment averages the pixel signals of adjacent pixels which output pixel signals via different horizontal output lines in full pixel readout. While parallel readout increases the frame rate in full pixel readout, the low resolution readout mode can prevent any unnatural image.

Figure 7:
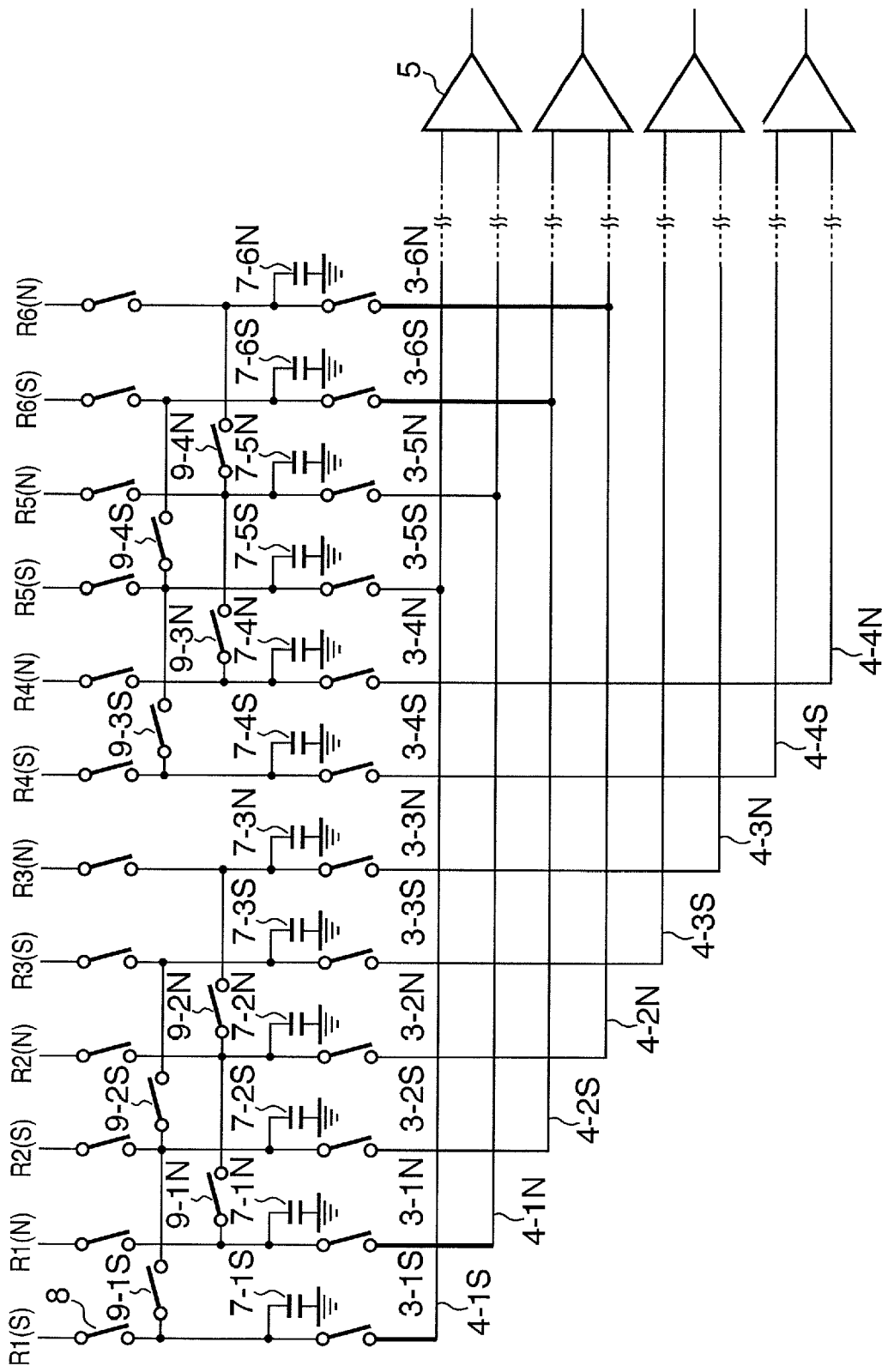
FIG. 7 is a circuit diagram showing a modification of the image sensor according to the second embodiment of the present invention.

FIG. 7 is a circuit diagram showing a modification to the second embodiment shown in FIG. 5. A part shown in FIG. 7 corresponds to the first six pixels in FIG. 5. In the modification shown in FIG. 7, the capacitors 7-xN and 7-xS hold a pixel output (N output) in the reset state, and a valid pixel output, i.e., photocharge-equivalent output (S output). In this case, x represents a column in the pixel array area. For example, 7-1N and 7-1S mean capacitors for holding N and S outputs from a pixel on the first column. The column selecting switches 3-xN and 3-xS are column selecting switches for N and S outputs, respectively. For example, 3-1N and 3-1S mean column selecting switches for N and S outputs from a pixel on the first column.

The operation in the modification is the same as that in FIG. 5 except that a pair of differential outputs, i.e., N and S outputs form one output pixel signal (output channel). Averaged outputs are respectively output from the capacitors 7-1S, 7-1N, 7-6S, 7-6N, 7-7S, 7-7N, 7-12S, and 7-12N to four horizontal output line pairs 4-1, 4-2, 4-3, and 4-4. In this case, 4-1N and 4-1S form the horizontal output line pair 4-1, 4-2N and 4-2S form the horizontal output line pair 4-2, 4-3N and 4-3S form the horizontal output line pair 4-3, and 4-4N and 4-4S form the horizontal output line pair 4-4.

In addition to the merits of the first embodiment, the image sensor according to the second embodiment can read out averages to output a high-quality moving image whose resolution is decreased uniformly at a high S/N ratio.

Third Embodiment

Figure 8:
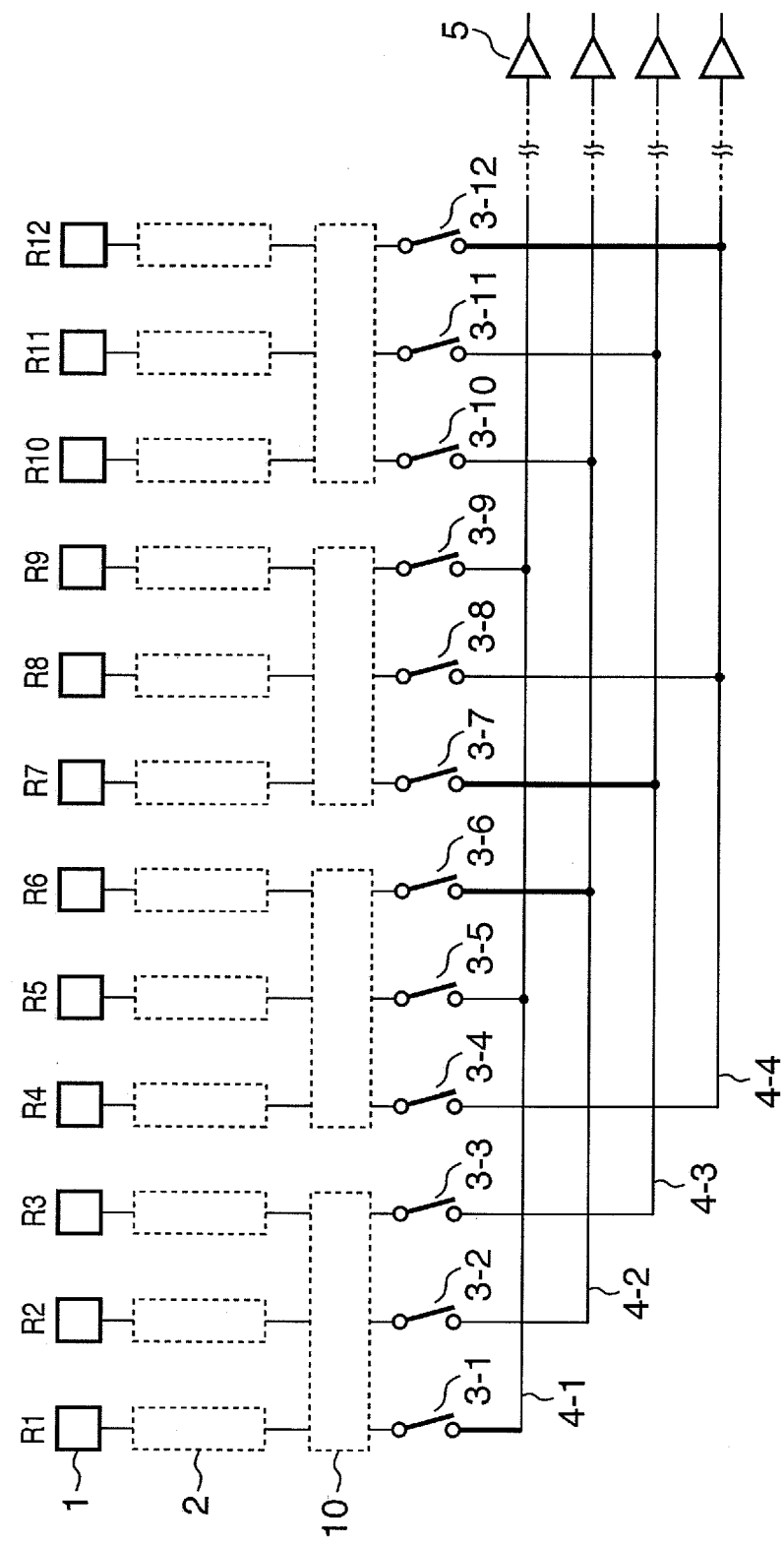
FIG. 8 is a circuit diagram showing the schematic arrangement of an image sensor according to the third embodiment of the present invention.

FIG. 8 is a circuit diagram showing the schematic arrangement of an image sensor according to the third embodiment of the present invention. The arrangement shown in FIG. 8 is different from that shown in FIG. 4 in that add circuits 10 are inserted between readout circuits 2 and column selecting switches 3, instead of the averaging circuits 6.

The add circuit (operation circuit) 10 calculates and outputs the sum of pixel signals in accordance with an activation signal. An output from each add circuit 10 is supplied to one of four horizontal output lines through one of the switches corresponding to three pixels subjected to addition. Similar to the first and second embodiments, sum pixel signals from respective target readout areas are output to horizontal output lines 4-1, 4-2, 4-3, and 4-4 using the switches 3-1, 3-6, 3-7, and 3-12.

According to the third embodiment, similar to the first embodiment, the image sensor can parallely output a plurality of pixel signals from respective target readout areas through a plurality of horizontal output lines, increasing the frame rate in low resolution readout.

In both the full pixel readout operation and low resolution readout operation, the pixel signals of target readout pixels or areas are output to horizontal output lines determined by a common selection rule in the spatial order of the target readout pixels or areas. This can obviate the need to rearrange signals in low resolution readout, reducing the load on the circuit or device which processes signals output through amplifiers 5.

When the relation: N≦M+1 holds, it is possible to simplify the circuit arrangement, decrease the chip area, and reduce the parasitic capacitance of the horizontal output line.

The add circuit 10 in FIG. 8 is implemented with the same arrangement as that of the averaging circuit 6 in FIG. 5, but is different in readout operation.

Figure 9:
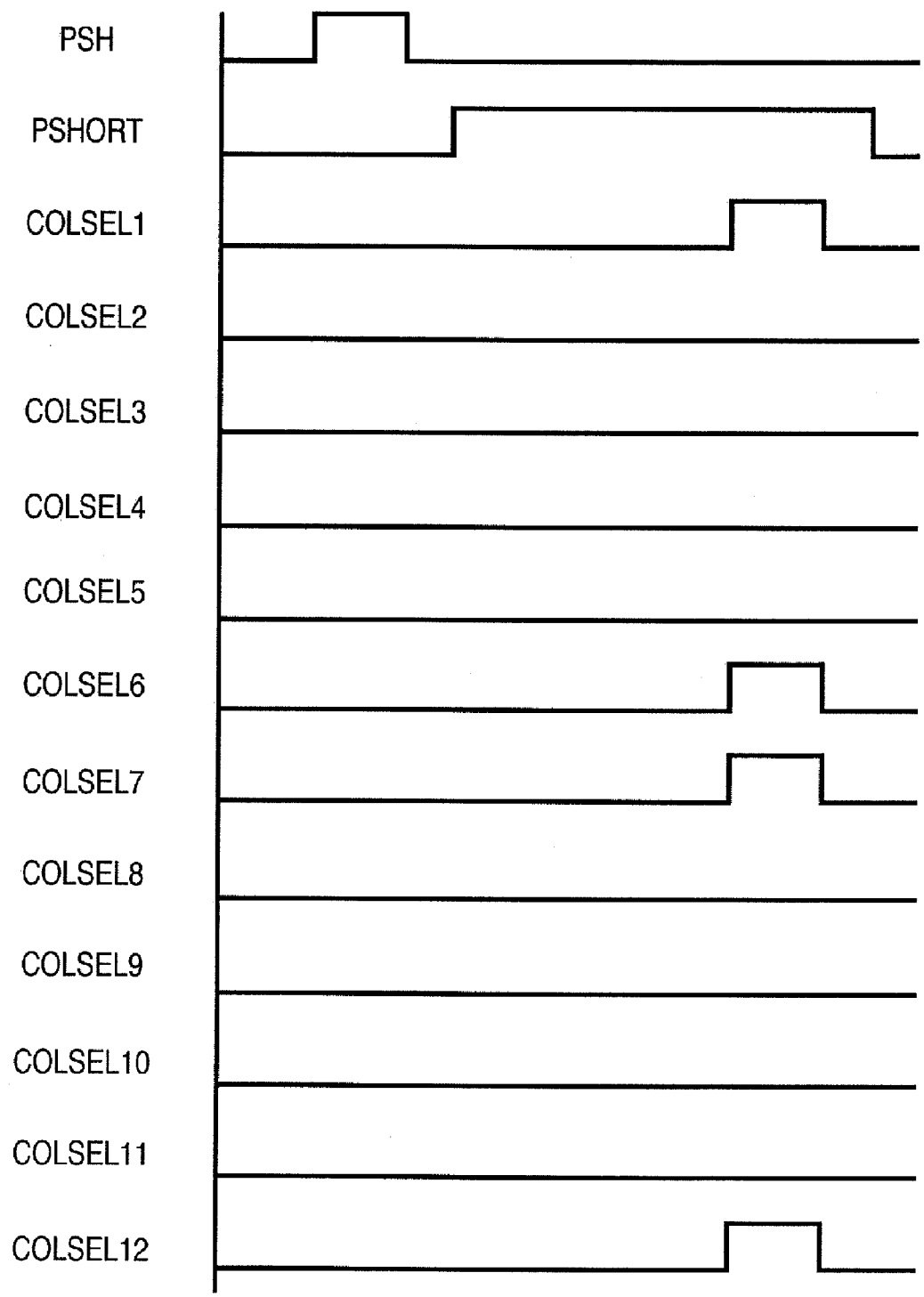
FIG. 9 is a driving timing chart of the additional readout mode (thinning readout mode) in the image sensor according to the third embodiment of the present invention.

The add circuit 10 performs the add process as follows. FIG. 9 is a timing chart of additional readout. A horizontal scanning circuit (control circuit: not shown) generates the control signals PSH, PSHORT, and COLSELx.

First, the control signal PSH causes capacitors 7 to hold pixel signals of one row as charges. Then, the control signal PSHORT changes to high level to turn on short switches 9 and merge pixel outputs held by the capacitors 7-1, 7-2, and 7-3 through the short switches 9-1 and 9-2. In this state, the column selecting switches 3-1, 3-6, 3-7, and 3-12 are turned on to output the sums to the horizontal output lines 4-1, 4-2, 4-3, and 4-4.

When pixel outputs from three pixels are equal, readout charges are three times larger than nonadd charges. Letting CH be the parasitic capacitance of the horizontal output line 4 and CT be the capacitance of the capacitor 7 in the case of reading out charges by capacitive division, the nonadd gain is CT/(CT+CH) and the add gain is 3·CT/(3·CT+CH). It is generally the same as the averaging process that the S/N ratio increases by $\sqrt{M}$ by adding the signals of M pixels. Since the gain is multiplied by M upon addition, the add process is effective especially when no enough output amplitude is ensured at low luminance. Addition can increase the signal amplitude to suppress the gain necessary for the output stage.

Fourth Embodiment

Figure 10A:
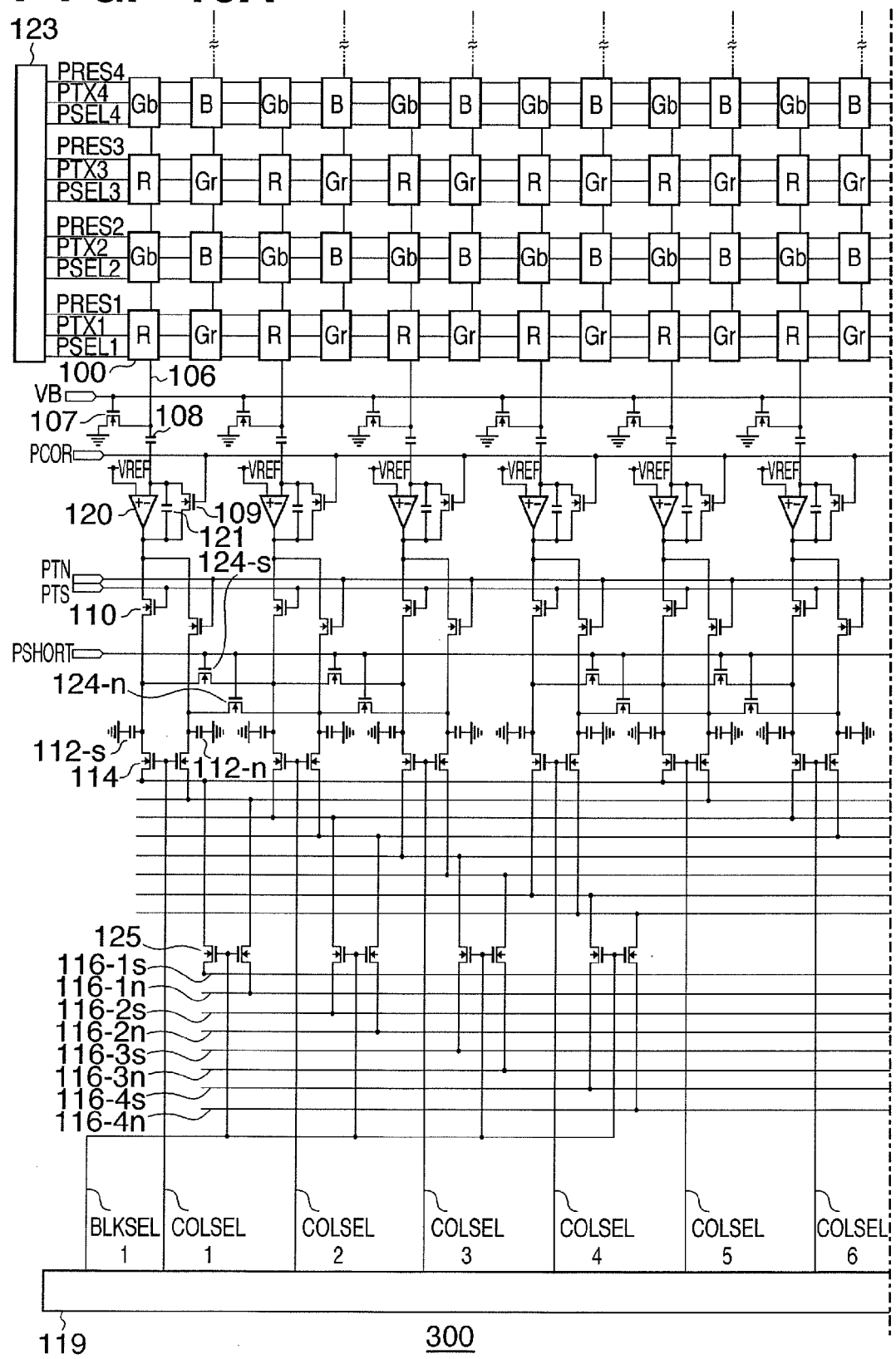
FIGS. 10A and 10B are circuit diagrams showing the schematic arrangement of an image sensor according to the fourth embodiment of the present invention.
Figure 10B:
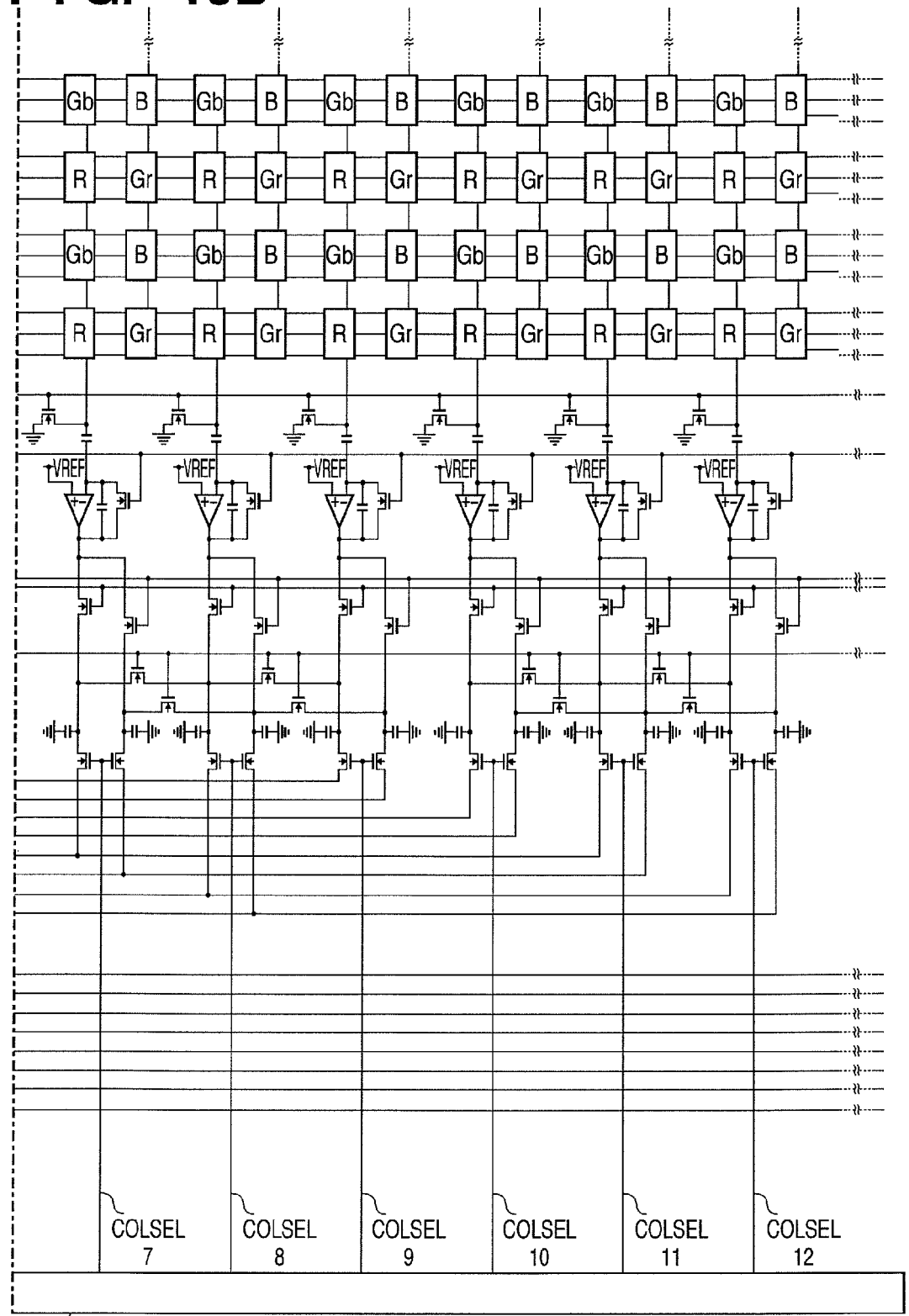

FIGS. 10A and 10B are circuit diagrams showing the schematic arrangement of an image sensor according to the fourth embodiment of the present invention. Color filters R, Gr, Gb, and B in the Bayer array are formed on pixels 100, and an area sensor is built by two-dimensionally arraying basic units each of 2×2 pixels.

Figure 11:
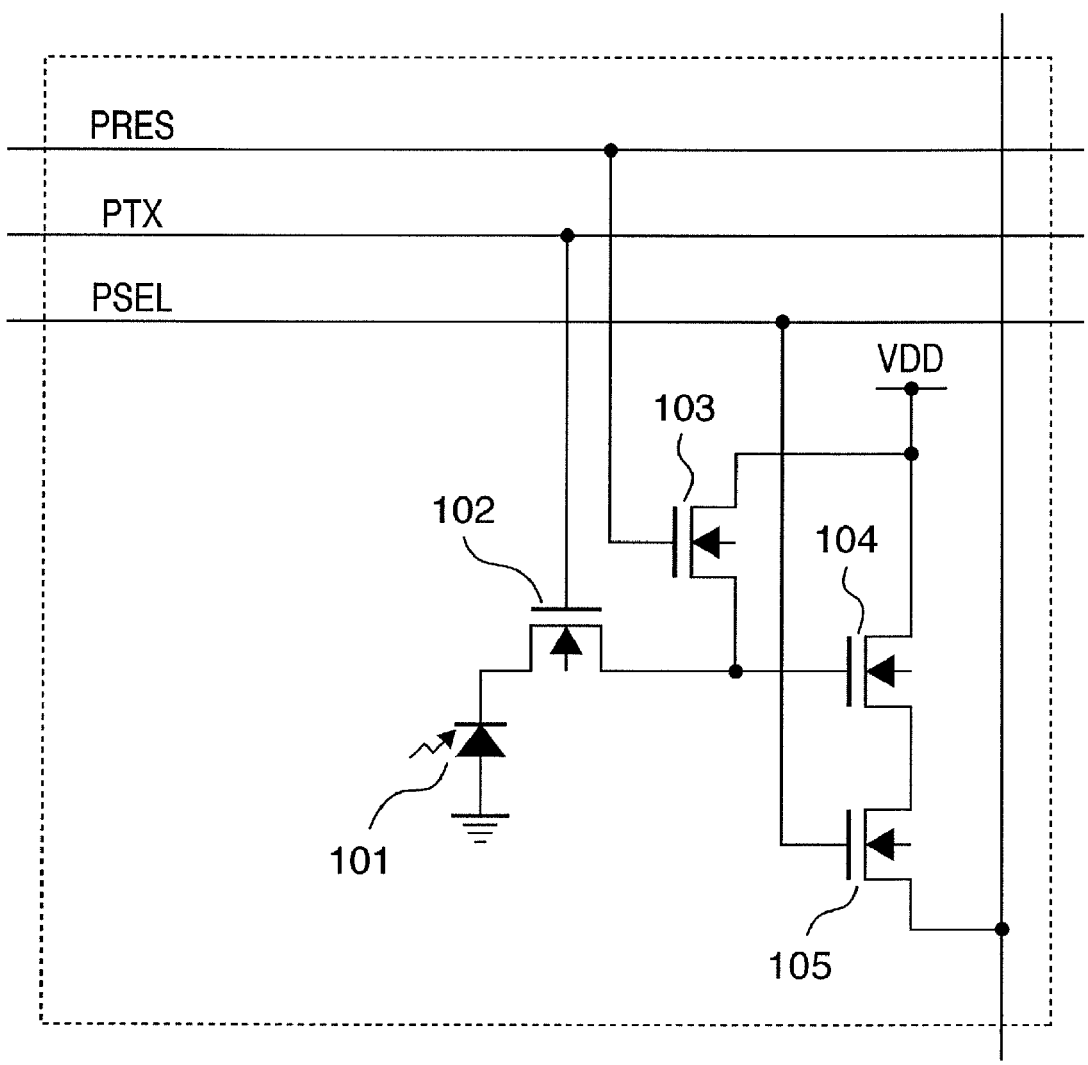
FIG. 11 is an equivalent circuit diagram of one pixel.

FIG. 11 is an equivalent circuit diagram of the pixel 100. A transfer pulse PTX, i.e., PTX1, PTX2, . . . controls a transfer switch 102. A reset pulse PRES, i.e., PRES1, PRES2, . . . controls a reset switch 103. A row selecting pulse PSEL, i.e., PSEL1, PSEL2, . . . controls a row selecting switch 105. A vertical scanning circuit 123 generates the transfer pulse PTX, reset pulse PRES, and row selecting pulse PSEL.

A full pixel readout operation in an image sensor 300 shown in FIGS. 10A and 10B will be explained with reference to the timing chart of FIG. 12. The following description assumes that a set exposure time has elapsed and a photodiode 101 accumulates photocharges prior to the readout operation.

A row on which R and Gr pixels are arranged side by side is selected. Signals from Gr pixels are read out by a circuit which is arranged at an upper portion in FIGS. 10A and 10B and identical to an R pixel/Gb pixel readout circuit.

A process to read out pixel signals from R pixels will be explained as an example. First, the pixel reset pulse PRES changes from high level to low level to cancel reset of the gate electrode of an amplifier MOSFET 104. At this time, the capacitor (to be referred to as CFD hereinafter) in the floating diffusion area connected to the gate electrode holds a voltage in the dark. Then, the row selecting pulse PSEL changes to high level, and an output in the dark appears on a vertical output line 106 due to a source follower circuit formed from the amplifier MOSFET 104 and a constant current source 107 in correspondence with the potential of the floating diffusion area. At this time, an operational amplifier 120 operates as a voltage follower, and its output is almost equal to the reference voltage VREF. Upon the lapse of a predetermined time, a clamp pulse PC0R changes from high level to low level to clamp the output in the dark on the vertical output line 106. Subsequently, PTN changes to high level, and a holding capacitor 112n holds a signal in the dark (this signal is called the N output) containing the offset of the operational amplifier 120.

The transfer pulse PTX changes the transfer switch 102 to high level for a predetermined period to transfer photocharges accumulated in the photodiode 101 to the gate electrode of the amplifier MOSFET 104. At this time, transferred charges are electrons. Letting Q be the absolute value of the transferred charge amount, the gate potential decreases by Q/CFD. In correspondence with this, an output in the light appears on the vertical output line 106. Letting Gsf be the source follower gain, the change ΔVvl of the potential Vvl of the vertical output line 106 from the output in the dark is given by $$\Delta Vvl = -Q/CFD \cdot Gsf \quad (1)$$

The potential change is amplified by an inverting amplifier circuit formed from the operational amplifier 120, a clamp capacitance 108, and a feed-back capacitance 121. An output Vct from the inverting amplifier circuit is given by $$Vct = VREF + Q/CFD \cdot Gsf \cdot C0/Cf \quad (2)$$

where C0 is the capacitance value of the clamp capacitance 108, and Cf is that of the feed-back capacitance 121. A holding capacitor 112s holds the output Vct (this signal is called the S output) while PTS is at high level.

Thereafter, column selecting switches 114 are sequentially selected by scan pulses COLSEL1, COLSEL2, . . . generated by a horizontal scanning circuit (control circuit) 119. Block selecting switches 125 arranged every 12 pixels are selected by scan pulses BLKSEL1, . . . . In response to this, signals held by the holding capacitors 112s and 112n are output to horizontal output lines 116-xs and 116-xn via the column selecting switch 114 and block selecting switch 125.

The block selecting switch 125 can reduce the parasitic capacitance of the horizontal output line by making only a column selecting switch in a target readout area seen as a load from the horizontal output line 116. The cycle at which the block selecting switches 125 are arranged is preferably a common multiple of the number N of output channels and the unit number M of thinned-out pixels. In this case, the pixel signals of target readout areas or pixels are output to horizontal output lines determined by a common rule in the spatial order of the target readout pixels or areas in both full pixel readout and thinning readout. Low resolution readout includes simple thinning (which means thinning by selection without any operation) as described in the first embodiment, average value operation as described in the second embodiment, and additional readout as described in the third embodiment.

A pair of horizontal output lines for the S and N outputs forms one output channel. In the fourth embodiment, four horizontal output line pairs 116-1, 116-2, 116-3, and 116-4 are laid out. In this case, 116-1s and 116-1n form the horizontal output line pair 116-1, 116-2s and 116-2n form the horizontal output line pair 116-2, 116-3s and 116-3n form the horizontal output line pair 116-3, and 116-4s and 116-4n form the horizontal output line pair 116-4.

Figure 12:
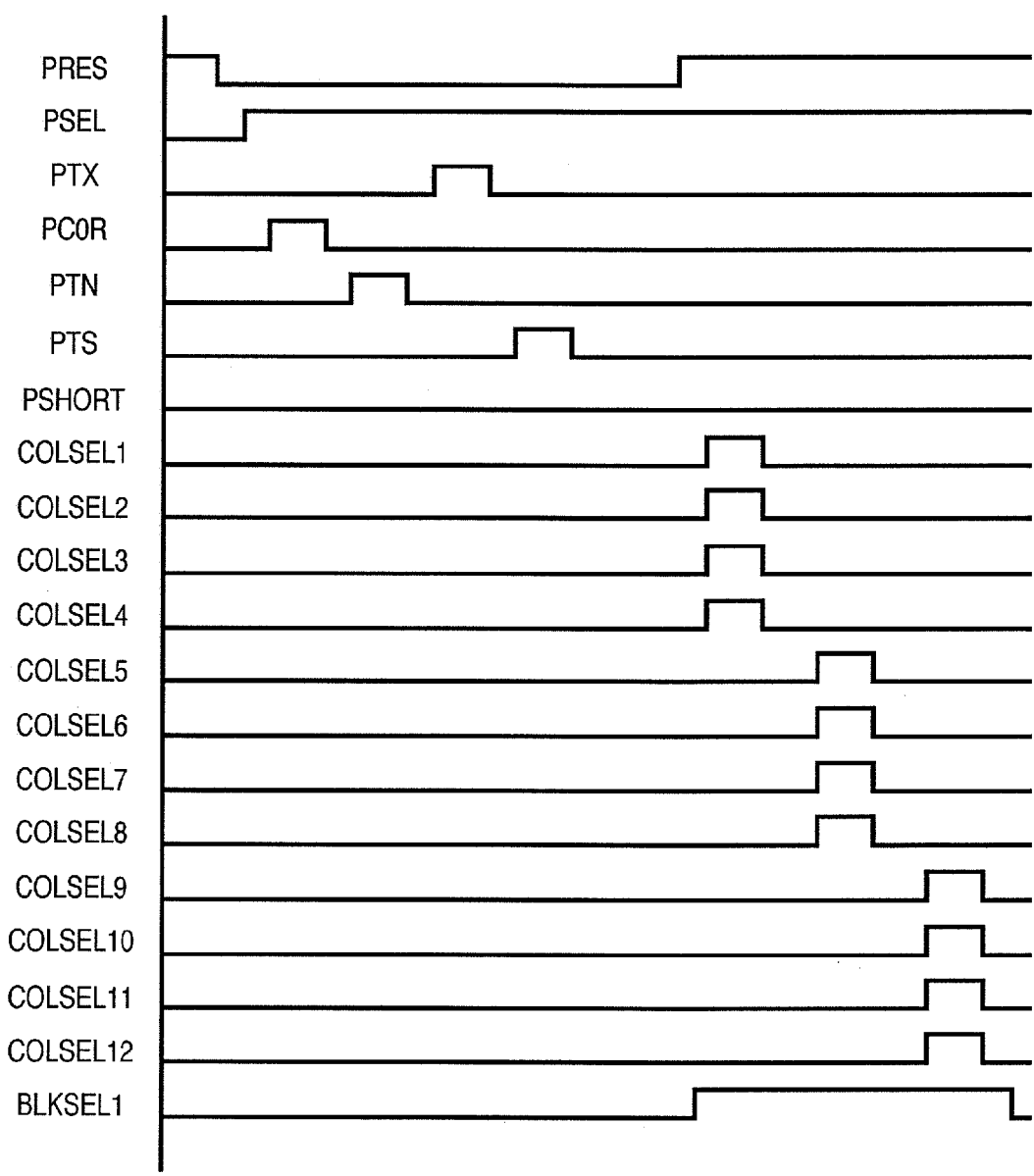
FIG. 12 is a driving timing chart of the full pixel readout mode in the image sensor according to the fourth embodiment of the present invention.
Figure 13:
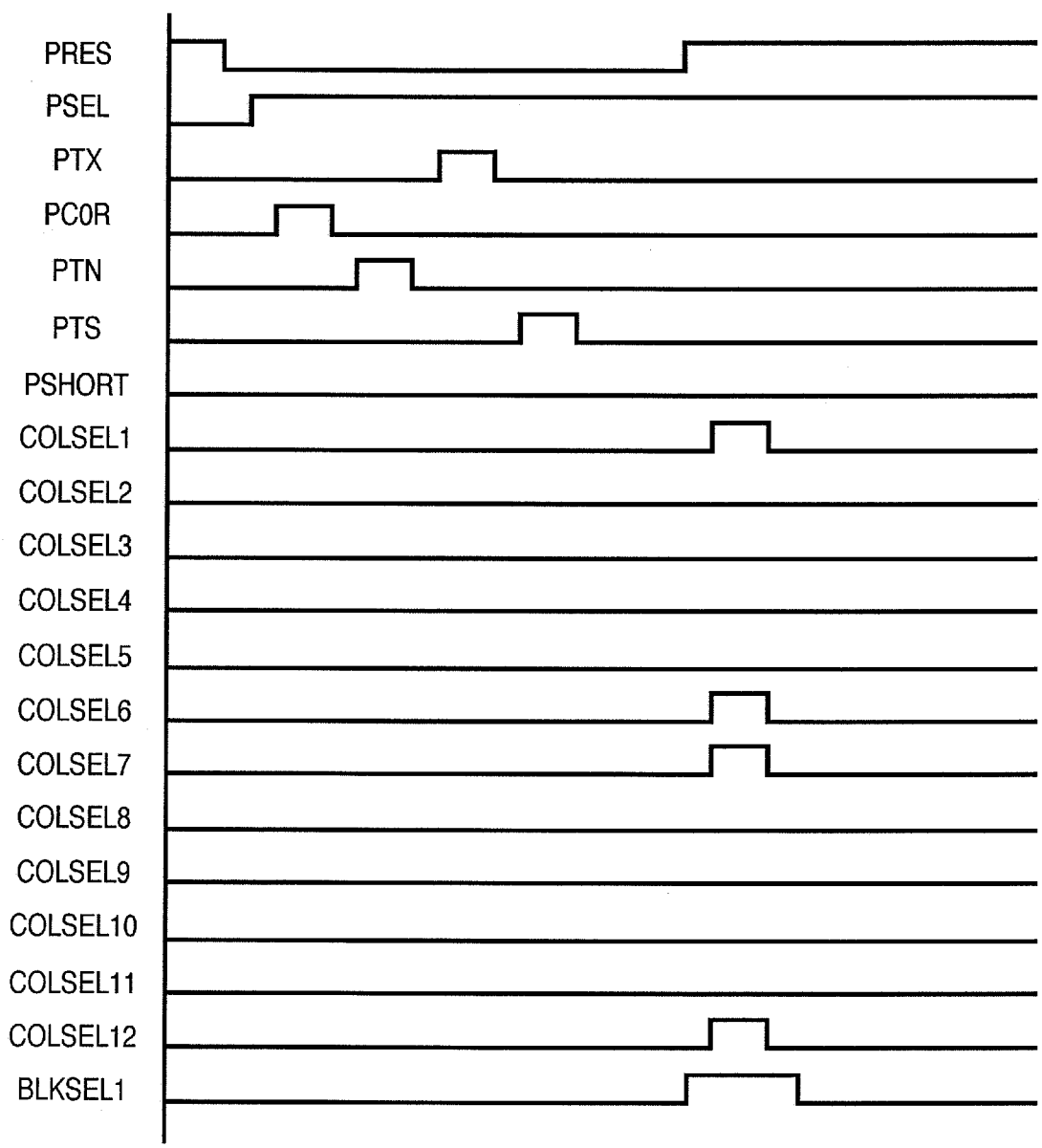
FIG. 13 is a driving timing chart of the simple thinning readout mode in the image sensor according to the fourth embodiment of the present invention.
Figure 14:
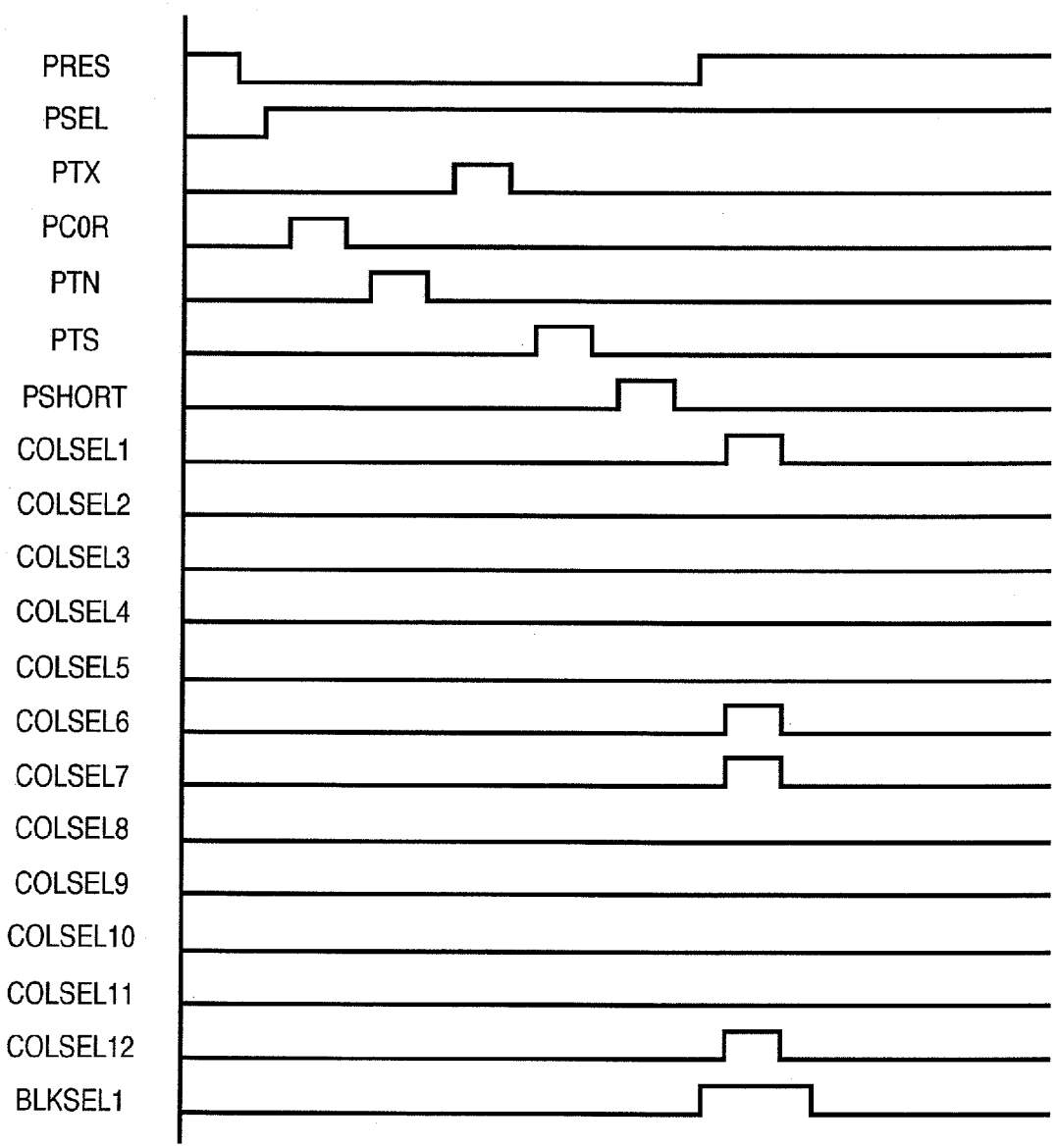
FIG. 14 is a driving timing chart of the average readout mode in the image sensor according to the fourth embodiment of the present invention.
Figure 15:
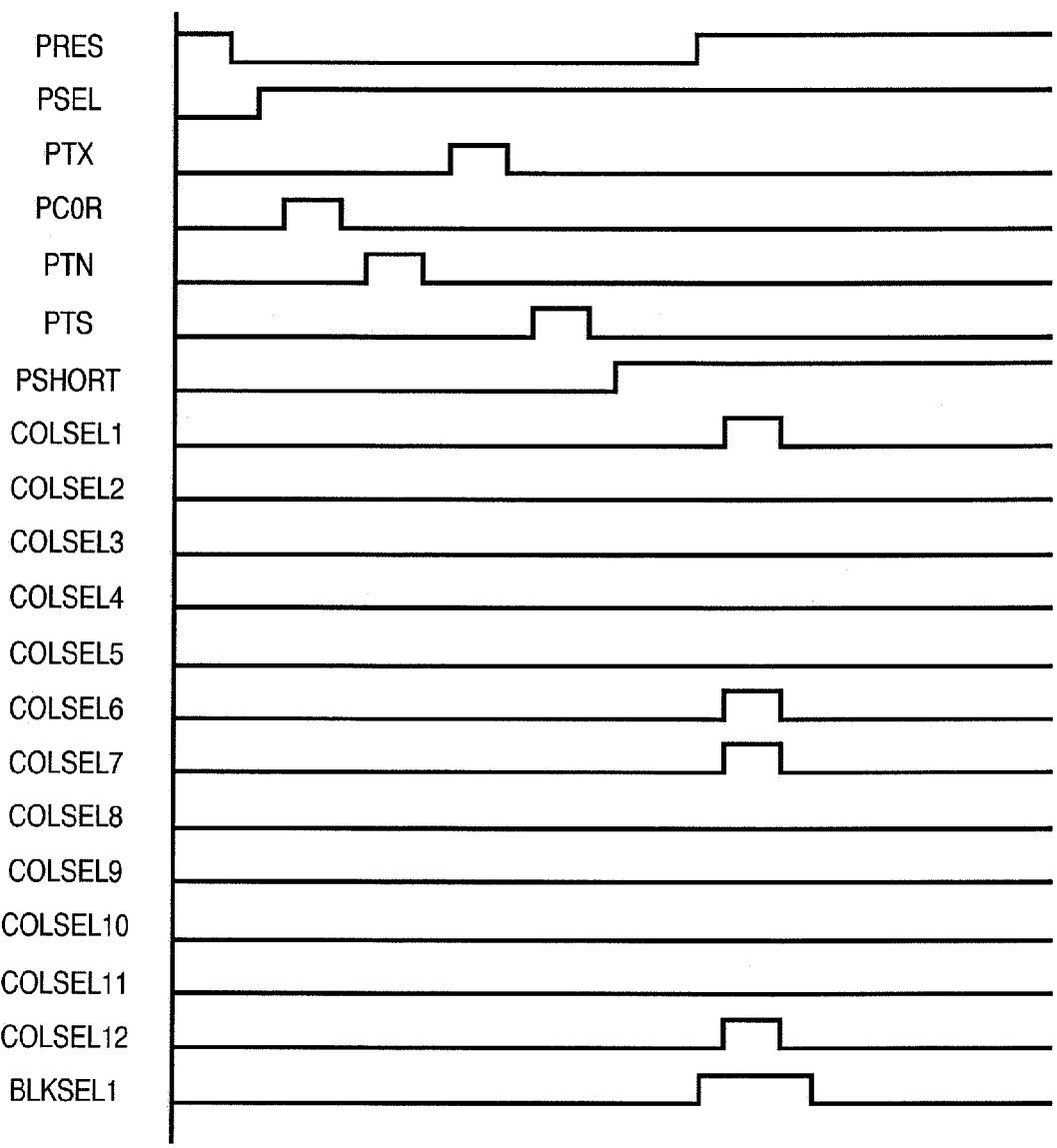
FIG. 15 is a driving timing chart of the additional readout mode in the image sensor according to the fourth embodiment of the present invention.

In full pixel readout, R pixel outputs from four pixels are parallely read out, as shown in FIG. 12. FIG. 13 is a timing chart of thinning readout from three pixels. FIG. 14 is a timing chart of average readout from three pixels. FIG. 15 is a timing chart of additional readout from three pixels.

Similar to the second and third embodiments, PSHORT represents a control signal to control short switches 124s and 124n, and either the averaging process or add process is executable in accordance with the timing of PSHORT. In both the averaging process and add process, COLSEL1, COLSEL6, COLSEL7, and COLSEL12 are simultaneously turned on to output four low-resolution R pixel signals (simply thinned-out signals, averaged signals, or added signals) to the four horizontal output line pairs 116-1 to 116-4. This means that pixels are read out from an area containing 12 R pixels because one pixel signal is obtained from three pixels by simple thinning, averaging, or addition.

The image sensor according to the fourth embodiment can achieve a frame rate four times higher in full pixel readout and 12 times higher in low resolution readout than that in the case of reading out one color by one output channel. The image sensor can switch between simple thinning (in this case, PSHORT is always at low level), average readout, and additional readout by the PSHORT pattern. This switching can be done by controlling PSHORT by the horizontal scanning circuit 119 in accordance with a switching signal.

Figure 16:
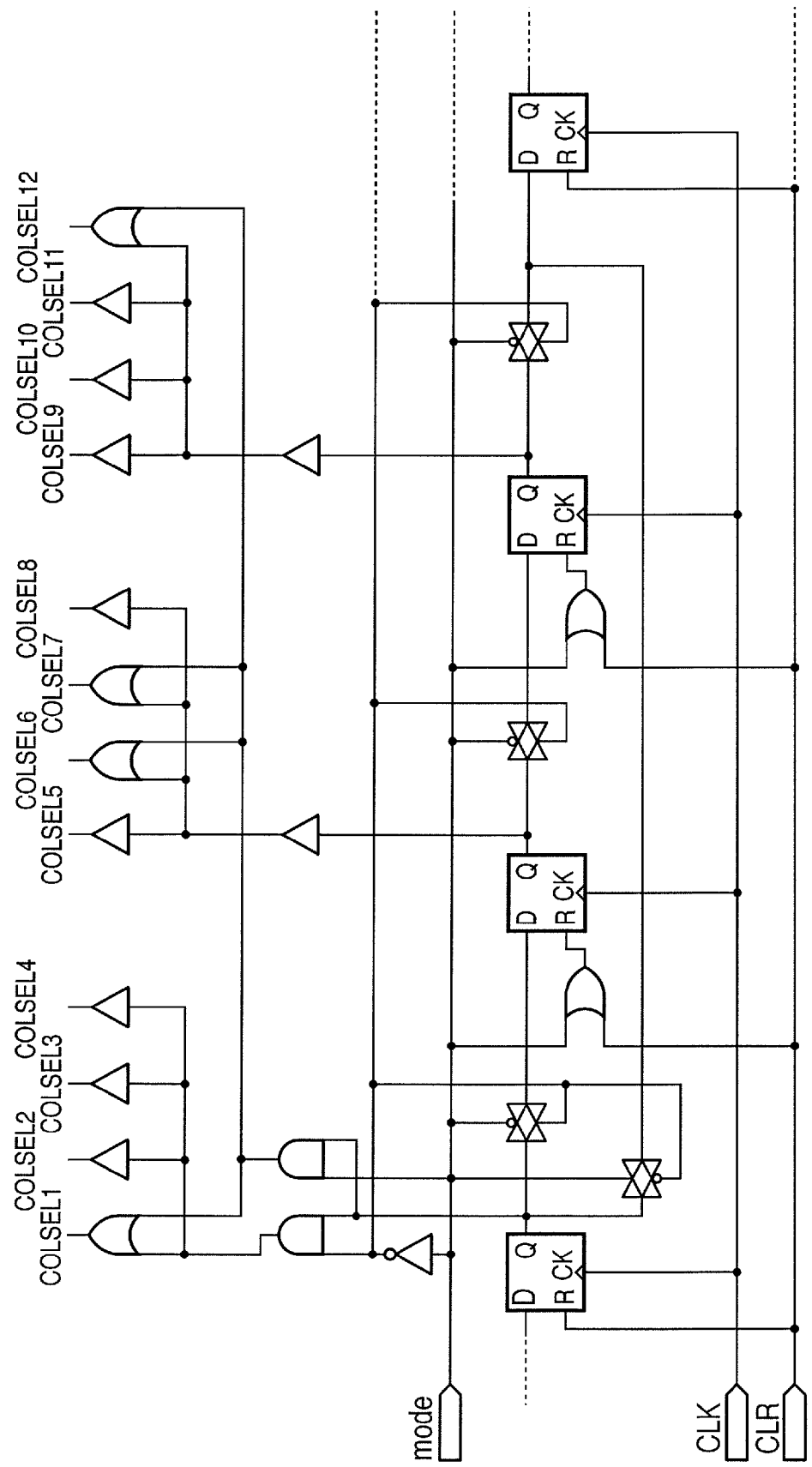
FIG. 16 is a circuit diagram illustrating part of the arrangement of a horizontal scanning circuit in the image sensor according to the fourth embodiment of the present invention.

FIG. 16 is a circuit diagram illustrating part of the arrangement of the horizontal scanning circuit 119. The horizontal scanning circuit 119 can generate a scan pulse in normal readout shown in FIG. 12, and a scan pulse in thinning readout shown in FIGS. 13, 14, and 15.

In normal readout, the signal mode to switch between normal readout and low resolution readout (simple thinning, averaging, or addition) changes to low level. In this case, a horizontal shift register SR shifts data by one stage in synchronism with the clock CLK. In low resolution readout (simple thinning, averaging, or addition), the signal mode changes to high level. The horizontal shift register SR skips and shifts data every three stages. Along with this, COLSEL1, COLSEL6, COLSEL7, and COLSEL12 change to high level, implementing low resolution readout (simple thinning, averaging, or addition).

Figure 17:
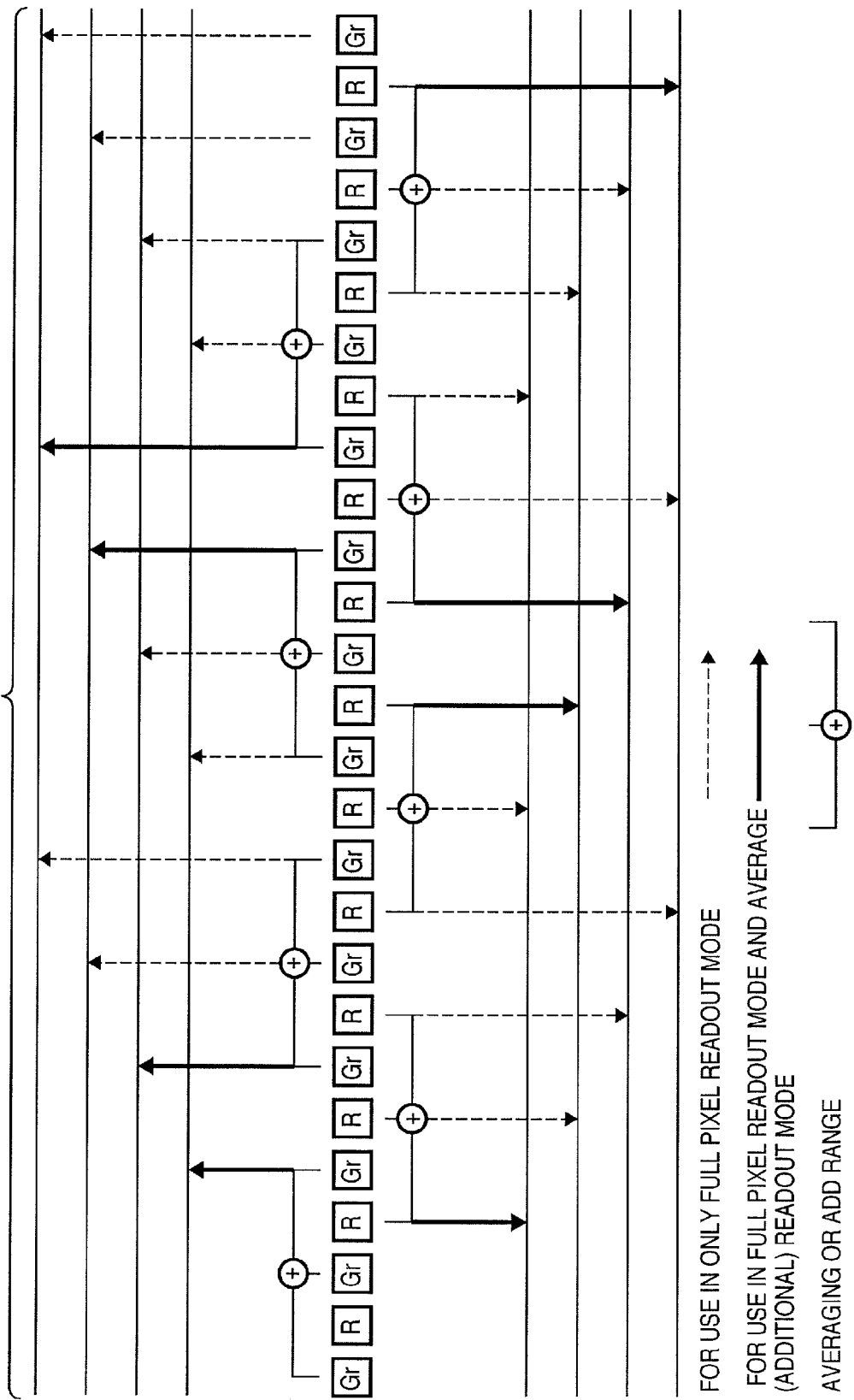
FIG. 17 is a conceptual view showing the relationship between readout of R pixels and that of Gr pixels in the image sensor according to the fourth embodiment of the present invention.

At the same time as the above-described readout of R pixels, signals from Gr pixels are read out by an upper circuit (not shown in FIGS. 10A and 10B). Particularly in average readout and additional readout, the centers of pixels to be averaged or added are preferably at equal intervals (regardless of whether pixels are R or Gr pixels), as shown in FIG. 17. This can uniformly decrease the resolution regardless of the color, obtaining a natural image. When the number N of output channels and the number M of pixels in a target readout area satisfy N=M+1, like the fourth embodiment, output colors are simultaneously read out from a target range in the order of R, Gr, R, Gr, . . . in full pixel readout, but in the order of Gr, R, Gr, R, . . . in low resolution readout. Areas from which pixel signals are simultaneously read out in low resolution readout shift to the left relatively to areas from which pixel signals are read out M times in full pixel readout. However, the spatial order from the left to right is still ensured, so no pixel signal need be replaced.

Fifth Embodiment

Figure 18:
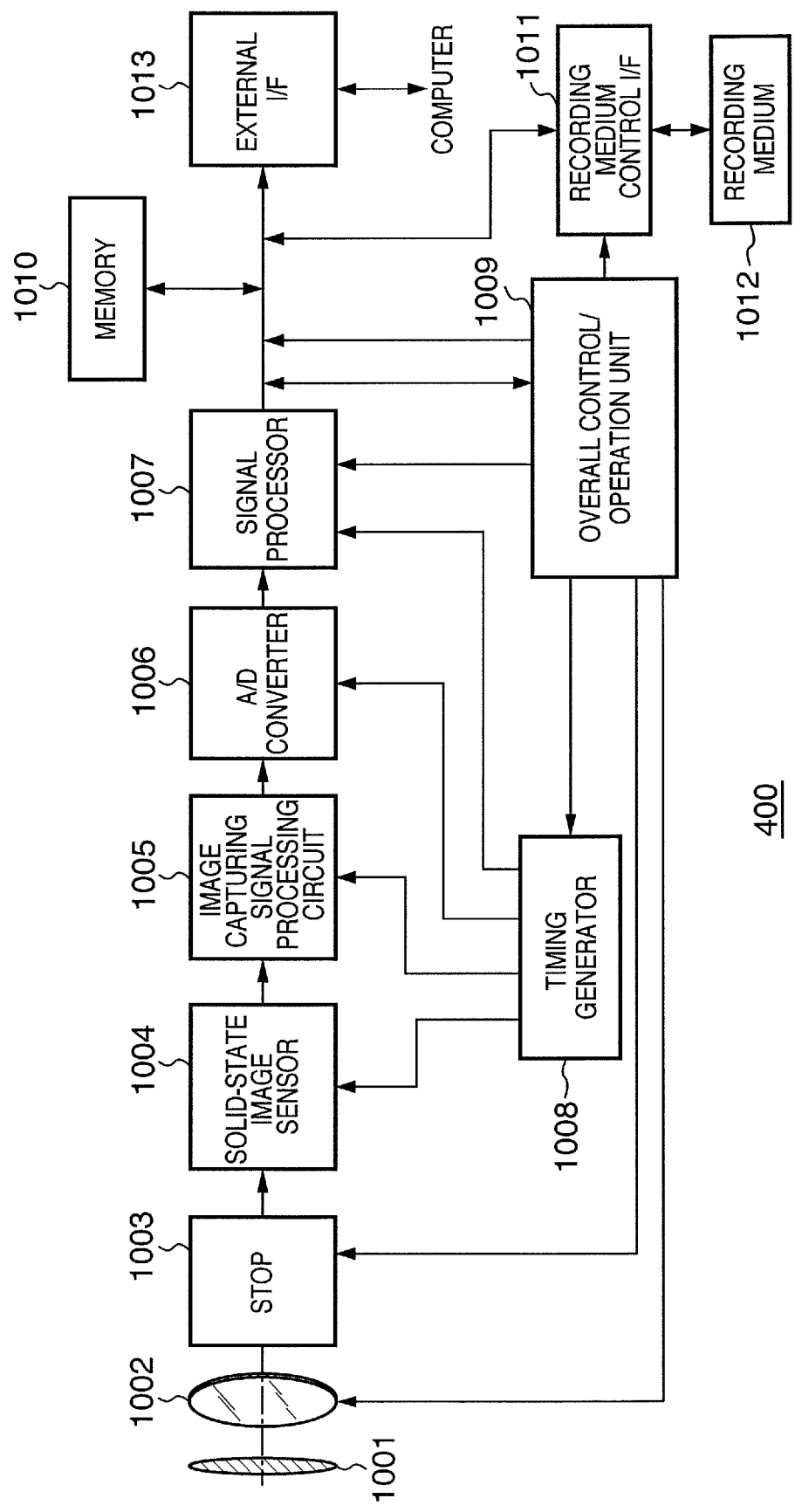
FIG. 18 is a block diagram showing an image capturing system according to the fifth embodiment of the present invention.

FIG. 18 is a block diagram showing the schematic arrangement of a camera according to a preferred embodiment of the present invention. A camera 400 comprises a solid-state image sensor 1004 exemplifying image sensors according to the first to fourth embodiments.

A lens 1002 forms an optical image of an object on the image capturing plane of the image sensor 1004. The outer surface of the lens 1002 is covered with a barrier 1001 which protects the lens 1002 and also serves as a main switch. The lens 1002 has a stop 1003 to adjust the quantity of light passing through the lens 1002. An image capturing signal processing circuit 1005 performs various processes such as correction and clamping for image capturing signals output from the image sensor 1004 through a plurality of channels. An A/D converter 1006 performs analog-to-digital conversion of image capturing signals output from the image capturing signal processing circuit 1005 through a plurality of channels. A signal processor 1007 performs various processes such as correction and data compression for image data output from the A/D converter 1006. The solid-state image sensor 1004, image capturing signal processing circuit 1005, A/D converter 1006, and signal processor 1007 operate in accordance with timing signals generated by a timing generator 1008.

The blocks 1005 to 1008 may be formed on the same chip as that of the solid-state image sensor 1004. An overall control/operation unit 1009 controls the blocks of the camera 400. The camera 400 comprises a memory 1010 for temporarily storing image data, and a recording medium control interface 1011 for recording/reading out an image on/from a recording medium. A recording medium 1012 includes a semiconductor memory and the like and is detachable. The camera 400 may comprise an external interface (I/F) 1013 for communicating with an external computer or the like.

The operation of the camera 400 shown in FIG. 18 will be described. In response to opening of the barrier 1001, the main power supply, the power supply of the control system, and the power supply of the image capturing circuit including the A/D converter 1006 are sequentially turned on. To control the exposure, the overall control/operation unit 1009 sets the stop 1003 to the full-aperture state. A signal output from the image sensor 1004 enters the A/D converter 1006 through the image capturing signal processing circuit 1005. The A/D converter 1006 A/D-converts the signal and outputs it to the signal processor 1007. The signal processor 1007 processes the data and supplies it to the overall control/operation unit 1009. The overall control/operation unit 1009 calculates and determines the exposure. The overall control/operation unit 1009 controls the stop based on the determined exposure.

The overall control/operation unit 1009 extracts a high-frequency component from the signal which is output from the solid-state image sensor 1004 and processed by the signal processor 1007, and calculates the distance to the object based on the high-frequency component. The overall control/operation unit 1009 drives the lens 1002 to determine whether the object is in focus. If the overall control/operation unit 1009 determines that the object is out of focus, it drives the lens 1002 again to measure the distance.

After confirming that the object is in focus, actual exposure starts. After the end of exposure, an image capturing signal output from the solid-state image sensor 1004 undergoes correction and the like by the image capturing signal processing circuit 1005, is A/D-converted by the A/D converter 1006, and is processed by the signal processor 1007. The image data processed by the signal processor 1007 is accumulated in the memory 1010 by the overall control/operation unit 1009.

The image data accumulated in the memory 1010 is recorded on the recording medium 1012 via the recording medium control I/F under the control of the overall control/operation unit 1009. The image data can be provided to a computer or the like via the external I/F 1013 and processed by it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100395, filed on Mar. 31, 2006, which is hereby incorporated by reference herein in its entirety.

What is claimed is:

1. An image sensor which has a plurality of pixels arrayed to form a plurality of columns, and which provides (a) a high resolution readout mode in which pixel signals of all the pixels are read out and (b) a low resolution readout mode in which one pixel signal is read out from each target readout area including a plurality of pixels and in which a resolution is lower than in the high resolution readout mode, the sensor comprising:
   a plurality of readout circuits which generate pixel signals based on signals supplied from the pixels of respective columns;
   a plurality of output channels;
   a plurality of column selecting switches; and
   a control circuit which controls said plurality of column selecting switches,
   wherein said control circuit controls said plurality of column selecting switches so as to output pixel signals of target readout pixels to output channels selected in accordance with a selection rule in a spatial order of the target readout pixels in the high resolution readout mode, and
   wherein said control circuit controls said plurality of column selecting switches so as to output pixel signals of target readout areas, each target readout area including a plurality of pixels, to output channels selected in accordance with the same rule as the selection rule in a spatial order of the target readout areas in the low resolution readout mode.

2. The sensor according to claim 1, wherein letting N be the number of output channels and M be the number of pixels in the target readout area N≦M+1 holds.

3. The sensor according to claim 1, further comprising a plurality of averaging circuits which are inserted between said plurality of readout circuits and said plurality of column selecting switches, and which generate pixel signals by calculating an average of pixel signals read out from pixels in each target readout area in the low resolution readout mode.

4. The sensor according to claim 1, further comprising a plurality of add circuits which are inserted between said plurality of readout circuits and said plurality of column selecting switches, and which generate pixel signals by calculating a sum of pixel signals read out from pixels in each target readout area in the low resolution readout mode.

5. The sensor according to claim 1, further comprising a plurality of operation circuits which are inserted between said plurality of readout circuits and said plurality of column selecting switches, and which generate pixel signals by calculating an average or sum of pixel signals read out from pixels in each target readout area in the low resolution readout mode in accordance with a mode.

6. The sensor according to claim 1, further comprising a plurality of operation circuits which are inserted between said plurality of readout circuits and said plurality of column selecting switches, and which generate pixel signals by calculating pixel signals read out from pixels in each target readout area in the low resolution readout mode.

7. The sensor according to claim 1, further comprising a block selecting switch which divides the plurality of pixels into blocks each of a plurality of columns, and which controls outputs from pixels of the plurality of columns of each block to said plurality of output channels.

8. An image sensor which has a plurality of pixels arrayed to form a plurality of columns, and which provides (a) a high resolution readout mode in which pixel signals of all the pixels are read out and (b) a low resolution readout mode in which one pixel signal is read out from each target readout area including a plurality of pixels and in which a resolution is lower than in the high resolution readout mode, the sensor comprising:
   a plurality of readout circuits which generate pixel signals based on signals supplied from the pixels of respective columns;
   a plurality of operation circuits which generate pixel signals by calculating pixel signals read out from the pixels in each target readout area in the low resolution readout mode;
   a plurality of output channels;
   a plurality of column selecting switches; and
   a control circuit which controls said plurality of column selecting switches,
   wherein said control circuit controls said plurality of column selecting switches so as to simultaneously output pixel signals of pixels equal in number to said plurality of output channels to said plurality of output channels in the high resolution readout mode, and
   wherein said control circuit controls said plurality of column selecting switches so as to simultaneously output pixel signals of target readout areas equal in number to said plurality of output channels to said plurality of output channels in the low resolution readout mode, each target readout area including a plurality of pixels.

9. The sensor according to claim 8, wherein said operation circuits include a circuit which calculates an average of pixel signals read out from pixels in each target readout area.

10. The sensor according to claim 8, wherein said operation circuits include a circuit which calculates a sum of pixel signals read out from pixels in each target readout area.

11. The sensor according to claim 8, wherein a pixel array formed by the plurality of pixels is divided into a plurality of blocks, and
   wherein the sensor further comprises a plurality of block selecting switch which control connection between the plurality of blocks and said plurality of output channels.

12. A camera comprising:
   an image sensor as defined in claim 1; and
   a circuit which processes signals output from a plurality of output channels of said image sensor.

13. A camera comprising:
   an image sensor as defined in claim 8; and
   a circuit which processes signals output from a plurality of output channels of said image sensor.

* * * * *